United States Patent
Hsu

(10) Patent No.: US 8,175,414 B2
(45) Date of Patent: May 8, 2012

(54) DYNAMIC NOISE FILTER AND SIGMA FILTERING METHOD

(75) Inventor: Jeng-Yun Hsu, Hsin Chu (TW)

(73) Assignee: Silicon Integrated Systems Corp., Hsin Chu (TW)

( * ) Notice: Subject to any disclaimer, the term of this patent is extended or adjusted under 35 U.S.C. 154(b) by 570 days.

(21) Appl. No.: 12/398,201

(22) Filed: Mar. 5, 2009

(65) Prior Publication Data

US 2010/0188582 A1   Jul. 29, 2010

(30) Foreign Application Priority Data

Jan. 23, 2009   (TW) .............................. 98102693 A

(51) Int. Cl.
*H04N 5/00* (2011.01)
*G06K 9/36* (2006.01)

(52) U.S. Cl. .... 382/286; 382/254; 348/607; 348/E5.001

(58) Field of Classification Search .................. 382/254, 382/260, 261, 275, 286; 348/607, E5.001
See application file for complete search history.

(56) References Cited

U.S. PATENT DOCUMENTS

| | | | | |
|---|---|---|---|---|
| 5,512,956 | A * | 4/1996 | Yan .............................. | 348/606 |
| 6,064,776 | A * | 5/2000 | Kikuchi et al. ............... | 382/260 |
| 6,389,177 | B1 * | 5/2002 | Chu et al. ...................... | 382/268 |
| 6,983,079 | B2 * | 1/2006 | Kim .............................. | 382/275 |
| 2006/0050783 | A1 * | 3/2006 | Le Dinh et al. ............. | 375/240.2 |

* cited by examiner

*Primary Examiner* — Stephen R Koziol
(74) *Attorney, Agent, or Firm* — Muncy, Geissler, Olds & Lowe, PLLC

(57) ABSTRACT

A dynamic noise filter is disclosed, which includes a noise estimation circuit, a TNR filtering circuit, a SNR filtering circuit, a blending circuit and a motion estimation circuit. By performing noise estimation for each image, the invention dynamically adjusts the strengths of the TNR filter and the SNR filter as well as a blending ratio between the outputs of the TNR filter and the SNR filter, thereby obtaining the best image quality.

29 Claims, 18 Drawing Sheets

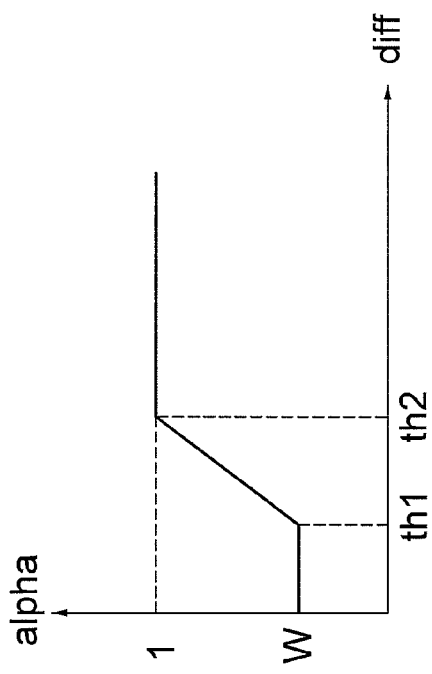
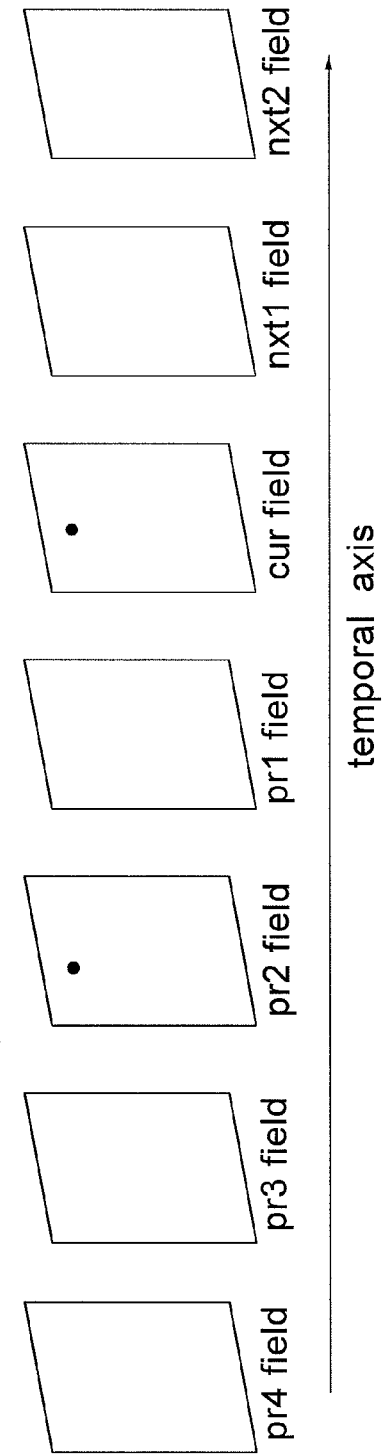
FIG. 1A (PRIOR ART)
FIG. 1B (PRIOR ART)

pre2 field after a TNR filter is applied cur field before a TNR filter is applied cur field after a TNR filter is applied

DYNAMIC NOISE FILTER AND SIGMA FILTERING METHOD

This application claims the benefit of the filing date of Taiwan Application Ser. No. 098102693, filed on Jan. 23, 2009, the content of which is incorporated herein by reference.

BACKGROUND OF THE INVENTION

1. Field of the Invention

The invention relates to a noise filter, particularly to a dynamic noise filter.

2. Description of the Related Art

FIG. 1A shows a characteristic curve of a temporal noise reduction (TNR) filter in the prior art. FIG. 1B shows the relationship of continuous fields versus a temporal axis.

Noise reduction of image data is generally realizes through averaging likely correlated pixels. Referring to FIGS. 1A and 1B, for example, among interlaced fields sequentially arranged in a temporal axis, the TNR filter compares the luminance of one single pixel (assuming a pixel pixel(cur, i, j) at the coordinate (i,j) of the current field, called "cur field") with the luminance of the pixel pixel(pre2, i, j) at the same coordinate (i,j) of the second preceding field (called "pre2 field"). If the absolute value of luminance difference (diff=abs(pixel(cur,i,j)−pixel(pre2, i,j))) is less than th1, the pixel at the coordinate (i,j) is treated to be static and the difference diff is assumed to be caused by noise (assuming noise is low amplitude). If diff is more than th2, the pixel at the coordinate (i,j) is treated to be in motion. After the pixel pixel(cur, i, j) is provided to the TNR filter, the corresponding output value of the TNR filter is as follows:

$$\text{pixel}(cur,i,j) = \text{pixel}(cur,i,j) \times \text{alpha} + \text{pixel}(pre2,i,j) \times (1-\text{alpha}) \quad (1).$$

It should be noted that throughout the specification i is defined as a row index in an image (for example, a field or a frame) and j is defined as a column index.

Although the TNR filter has obvious noise reduction effect on static images, it has the following disadvantages for motion images. When the amount of movement of an object is relatively small between continuous images, the relative positions related to the object edge in the cur field and in the pre2 field are shown in FIG. 2A. FIG. 2B shows the absolute luminance differences between the cur field and the pre2 field in FIG. 2A. FIG. 2C shows a result after the characteristic curve of FIG. 1A is applied to the absolute luminance differences of FIG. 2B. As can be observed from FIGS. 2A~2C, when the amount of movement of the object is relatively small between continuous images, there is a trailing effect on the moving object after the characteristic curve in FIG. 1A is applied.

When the amount of movement of an object is relatively large between images, the relative positions related to the object edge in the cur field and in the pre2 field are shown in FIG. 3A. FIG. 3B shows the absolute luminance differences between the cur field and the pre2 field in FIG. 3A. FIG. 3C shows a result after the characteristic curve in FIG. 1A is applied to the absolute luminance differences of FIG. 3B. As can be observed from FIGS. 3A~3C, when the amount of movement of the object is relatively large between images, there is a ringing effect on the moving object after the characteristic curve in FIG. 1A is applied.

FIG. 4A shows a moving object in the pre2 field that has been processed by the TNR filter. FIG. 4B shows the same moving object as that of FIG. 4A in the cur field which is not processed by the TNR filter, where the dotted line represents the position of the object in the pre2 field and the solid line represents the position of the object in the cur field. Since the cur field of FIG. 4B is not processed by the TNR filter, there is a lot of noise in the background of the object. FIG. 4C shows the cur field that is processed by the conventional TNR filter. It can be seen from FIG. 4C that the noise background generates a shadow or trailing effect on the moving object.

A conventional noise filter is generally a combination of a TNR filter and a spatial noise reduction (SNR) filter. In general, parameters of a TNR filter and a SNR filter in the prior art are fixed once they are set. However, in practice, image contents are quite complicated; for example, there are different noise levels, different amounts of movement for different object, or different values of luminance difference between its objects and its backgrounds for each field. Accordingly, no matter which filter (a TNR filter or a SNR filter) is applied, one single preset characteristic curve or a set of parameters is insufficient to cover all the image contents, thereby lowering the image quality.

On the other hand, a conventional sigma filter calculates the average of the pixels having the luminance differences or the chrominance difference within a specific range and excludes the pixels having the luminance differences or the chrominance differences out of the specific range. For the example shown in FIG. 5A, assuming that a parameter ppdiff (referring to a definition of equation (8)) is the maximum absolute luminance difference in a block and a parameter factor is a preset value, a parameter R(=ppdiff×factor) is a range of luminance differences set by the system. According to the prior art, the sigma filter treats the luminance ya of a target pixel pixel(cur, i, j) as a criterion and calculates the average of the pixels having the luminance in the range of (ya−R) to (ya+R). For example, the pixels pixel(cur, i, j+2) and pixel(cur, i, j+3) will not be included in calculating the average since their luminance is too large. FIG. 5B shows the relation between an actual luminance difference R_diff(y,x) and a modified luminance difference m_diff(y,x) according to a conventional sigma filter. As shown in FIG. 5B, when the actual luminance difference R_diff(y,x)=(pixel(cur, y, x)−pixel(cur, i, j)) between a target pixel (i,j) (at the coordinate (i,j)) and an adjacent pixel (y,x) (y≠i and x≠j) is more than +R or less than −R, its corresponding modified luminance difference m_diff(y,x) equals 0 (that is, the slope slope2=∞). In other words, the pixel pixel(cur, y, x) will be excluded from average calculation by the sigma filter in the prior art.

Take a 1×5 (m=1 (number of rows) and n=5 (number of columns)) block for example. Assuming that factor-0.25 and the luminance of five pixels in the 1×5 block is 100, 51, 25, 0, and 5 (e.g., the middle pixel having the luminance value of 25 is the target pixel), according to the relation shown in FIG. 5B, R=(100−0)×0.25=25 and thus an output value out (=25+(0+0−25−20)/4=14) related to the target pixel is obtained at the output of the sigma filter. Assuming that there is some noise in the 1×5 block, the luminance of the five pixels becomes 104, 50, 25, 0, and 5, sequentially. According to the relation shown in FIG. 5B, R=(104−0)×0.25=26 and thus an output value out' (=25+(0+25−25−20)/4=20) related to the target pixel is obtained at the output of the sigma filter. From the above example, when there is some noise in the 1×5 block, a luminance difference of six grey levels (from 14 to 20) is produced at the output of the sigma filter according to the slope slope2=∞ in FIG. 5B and the target pixel, thereby rendering the output image quality unstable.

SUMMARY OF THE INVENTION

In view of the above-mentioned problems, one object of the invention is to provide a dynamic noise filter to dynamically modify the strengths of the SNR filter and the TNR filter and to dynamically modify a blending ratio between the output of the SNR filter and the output of the TNR filter by performing noise estimation for each image to thereby filter out noise and obtain the best image quality.

One embodiment of the invention provides a noise filter for filter out the noise in an image. The noise filter comprises a noise estimation circuit, a temporal noise reduction (TNR) filtering circuit, a motion estimation circuit, a spatial noise reduction (SNR) filtering circuit, and a blending circuit. The noise estimation circuit receives a current image and its corresponding preceding image and performs noise estimation to generate a temporal attribute parameter and a spatial attribute parameter. The TNR filtering circuit receives the current image and its corresponding preceding image and adjusts its own TNR characteristic curve to generate at least one first filtered scan line and the corresponding first parameter flow according to the temporal attribute parameter generated by the noise estimation circuit at the preceding image period. The motion estimation circuit performs both a setting and a motion estimation of a mosquito noise block according to an input image and its corresponding preceding image. The SNR filtering circuit generates a second filtered scan line and a corresponding second parameter flow according to the spatial attribute parameter generated by the noise estimation circuit at the preceding image period, preceding outputs of the motion estimation circuit, and the at least one first filtered scan line and the corresponding first parameter flow. The blending circuit sequentially blends the second filtered scan line and one of the at least one first filtered scan line to generate an output scan line according to the corresponding second parameter flow.

Another embodiment of the invention provides a dynamic noise filter for filtering out the noise in an image. The noise filter comprises a noise estimation circuit and a temporal noise reduction (TNR) filtering circuit. The noise estimation circuit receives a current image and its corresponding preceding image, performs noise estimation and generates a temporal attribute parameter. The TNR filtering circuit, coupled to the noise estimation circuit, receives the current image and the corresponding preceding image and adjusts its own TNR characteristic curve to generate a temporal filtered image according to the temporal attribute parameter generated by the noise estimation circuit at the preceding image period.

Another embodiment of the invention provides a dynamic noise filter for filtering out the noise in an image. The noise filter comprises a noise estimation circuit, a motion estimation circuit, and a spatial noise reduction (SNR) filtering circuit. The noise estimation circuit receives a current image and its corresponding preceding image, performs noise estimation and generates a spatial attribute parameter. The motion estimation circuit performs both a setting and a motion estimation of a mosquito noise block over the current image and its corresponding preceding image. The SNR filtering circuit receives the current image and generates a spatial filtered image according to the spatial attribute parameter generated by the noise estimation circuit at the preceding image period and preceding outputs of the motion estimation circuit According to one embodiment of the invention, a sigma filtering method is provided to process at least one image. The method comprises the following steps: receiving a m×n block of the image; according to a target pixel of the m×n block, calculating a actual pixel difference for each of the other pixels in the m×n block; modifying each actual pixel difference to be a corresponding modified pixel difference according to a predetermined pixel difference range and a predetermined negative slope; and, obtaining a filtered output value according to each modified pixel difference, the target pixel value and the number of pixels in the m×n block.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1A shows a characteristic curve of a TNR filter in the prior art.

FIG. 1B shows the relationship of continuous fields versus a temporal axis.

DETAILED DESCRIPTION OF THE INVENTION

The noise filter according to the invention may be hardware, software, or a combination of hardware and software (or firmware). An example of a pure solution would be a field programmable gate array (FPGA) design or an application specific integrated circuit (ASIC) design. An example of a hardware and software implementation would be a digital signal processor (DSP) and embedded firmware.

Figure 6A:
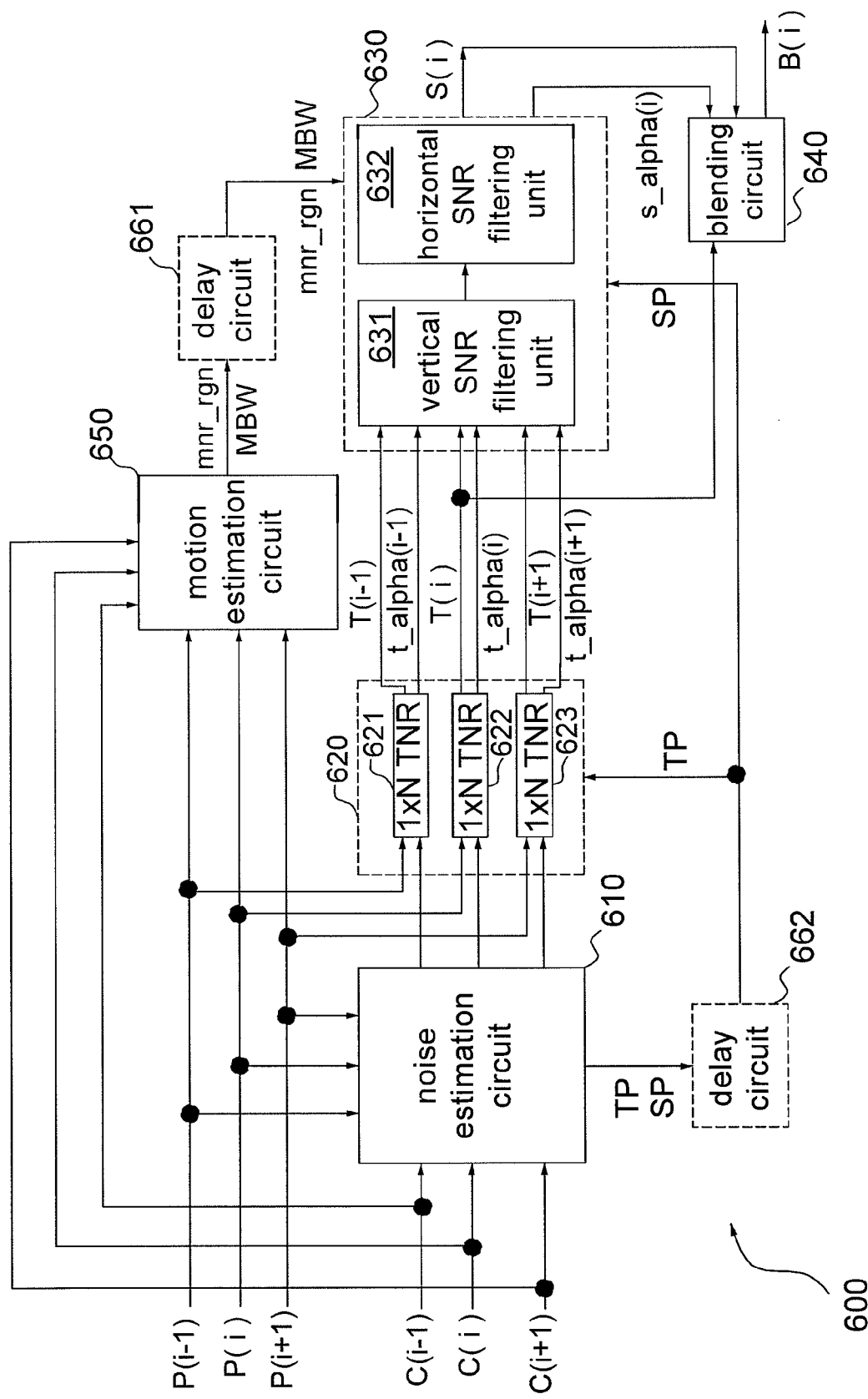
FIG. 6A shows a schematic diagram of a dynamic noise filter according to one embodiment of the invention.

FIG. 6A shows a schematic diagram of a dynamic noise filter according to one embodiment of the invention. Referring to FIG. 6A, the dynamic noise filter 600 according to the invention comprises a noise estimation circuit 610, a TNR filter 620, a SNR filter 630, a blending circuit 640, and a motion estimation circuit 650. In this embodiment, the noise estimation circuit 610 simultaneously receives three scan lines C(i−1), C(i), and C(i+1) of the cur field and three scan lines P(i−1), P(i), and P(i+1) of the pre2 field to perform noise estimation and thereby generates a temporal attribute parameter TP and a spatial attribute parameter SP. The temporal attribute parameter TP includes the parameters nr_th1 and nr_alpha while the spatial attribute parameter SP includes the parameters hl_coring, hc_coring, vl_coring, and vc_coring. In addition, each scan line includes a plurality of pixels and each pixel includes one luminance component and/or one chrominance component.

The TNR filter 620 coupled to the noise estimation circuit 610 simultaneously receives three scan lines C(i−1), C(i), and C(i+1) of the cur field and three scan lines P(i−1), P(i), and P(i+1) of the pre2 field. According to the temporal attribute parameter TP generated at the preceding field period by the noise estimation circuit 610, the TNR filter 620 blends the luminance values and/or chrominance values of the pixels at the same coordinate in the cur field and in the pre2 field to generate three temporal filtered scan lines T(i−1), T(i), and T(i+1) and their corresponding parameter flows t_alpha(i−1), t_alpha(i), and t_alpha(i+1). The motion estimation circuit 650 simultaneously receives three scan lines C(i−1), C(i), and C(i+1) of the curfield and three scan lines P(i−1), P(i), and P(i+1) of the pre2 field to perform both a mosquito flag setting for a mosquito noise block and a motion estimation for the mosquito noise block to generate a mosquito flag mnr_rgn and an amount of movement MBW. The SNR filter 630, coupled to the noise estimation circuit 610 and the TNR filter 620, simultaneously receives the above three temporal filtered scan lines T(i−1), T(i), and T(i+1) and their corresponding parameter flows t_alpha(i−1), t_alpha(i), and t_alpha(i+1) to generate a spatial filtered scan line S(i) and its corresponding parameter flow s_alpha(i) according to the mosquito flag mnr_rgn and the amount of movement MBW generated by the motion estimation circuit 650 at the second preceding field period and the spatial parameters SP generated by the noise estimation circuit 610 at the preceding field period. After receiving the spatial filtered scan line S(i), the temporal filtered scan line T(i), and the parameter flow s_alpha(i), the blending circuit 640 blends the luminance and/or chrominance of the pixels at the same coordinate in the scan lines S(i) and T(i) according to the parameter flow s_alpha(i) to generate an output scan line B(i). For example, in a case of the pixels at the coordinate (i,j), the output pixel value of the blending circuit 640 is B(i,j)=S(i,j)×s_alpha(i,j)+T(i,j)×(1−s_alpha(i,j)).

Figure 6B:
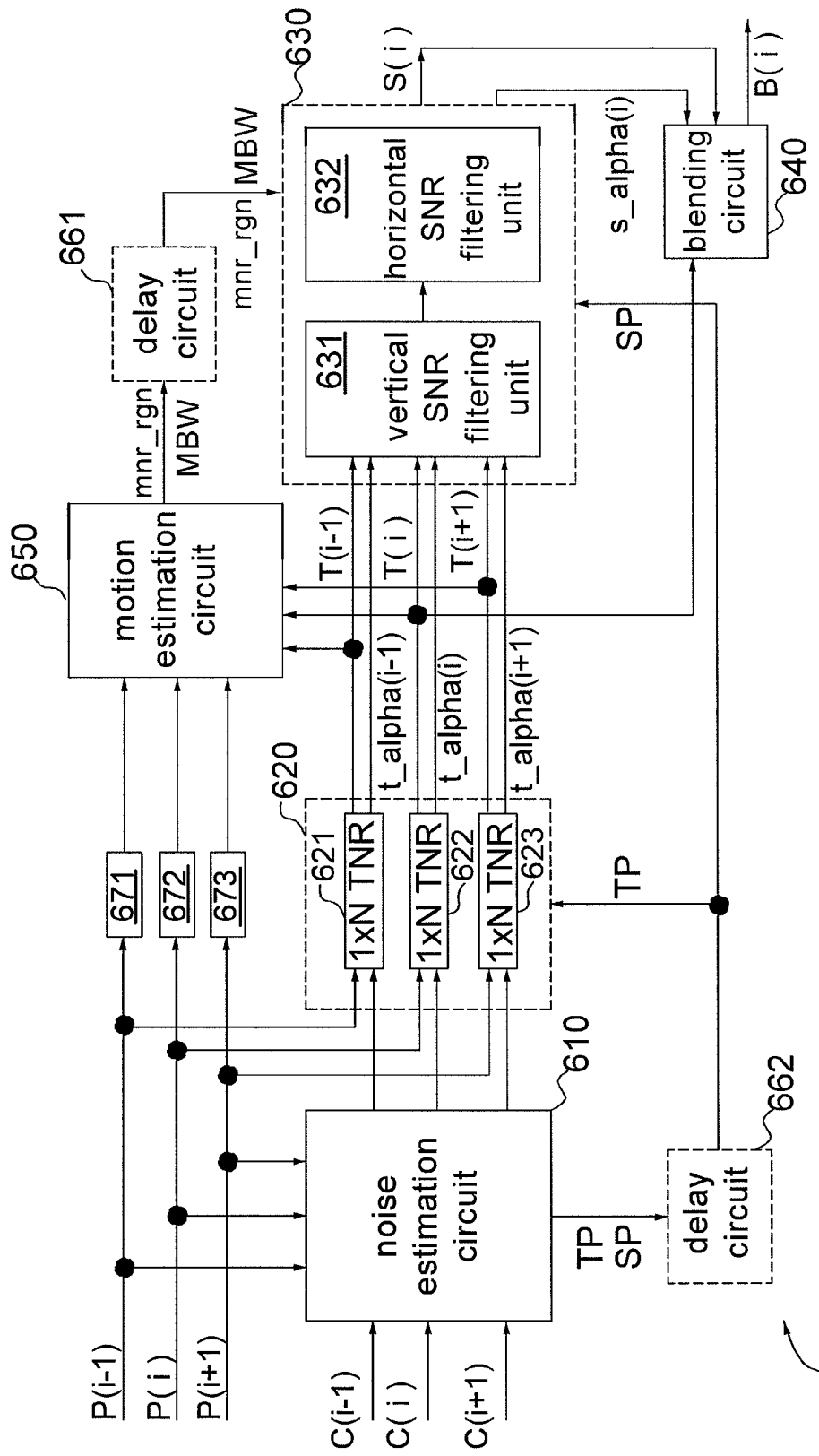
FIG. 6B shows a schematic diagram of the dynamic noise filter according to another embodiment of the invention.

FIG. 6B shows a schematic diagram of the dynamic noise filter according to another embodiment of the invention. In the embodiments shown in FIG. 6A and FIG. 6B, elements with the same reference number have the same structure and operations except the input portion of the motion estimation circuit 650. Specifically, the motion estimation circuit 650 shown in FIG. 6B receives three temporal filtered scan lines T(i−1), T(i), and T(i+1) from the TNR filter 620 and three scan lines P(i−1), P(i), and P(i+1) of the pre2 field to perform the mosquito flag setting of a mosquito noise block and the motion estimation of the mosquito noise block to generate the mosquito flag mnr_rgn and the amount of movement MBW. In the embodiment shown in FIG. 6B, since the motion estimation circuit 650 receives three temporal filtered scan lines T(i−1), T(i), and T(i+1) from the TNR filter 620, the front end of the motion estimation circuit 650 is additionally provided with three delay circuits 671~673 to compensate for the operating time of the TNR filter 620. As such, the scan lines P(i−1), P(i), and P(i+1) and the three scan lines T(i−1), T(i), and T(i+1) from the TNR filter 620 are able to be fed into the motion estimation circuit 650 simultaneously. Hereinafter, the invention will be described in detail according to the embodiment shown in FIG. 6A.

After performing noise estimation for the cur and pre2 fields, the noise estimation circuit 610 generates a temporal attribute parameter TP and a spatial attribute parameter SP. Meanwhile, the TNR filter 620 completes the processing of the cur and pre2 fields as well. Thus, the noise estimation result generated by the noise estimation circuit 610 according to the cur and pre2 fields is not allowed to be fed back and applied to the cur field, as shown in FIG. 1B. However, according to the invention, since the image contents between continuous fields or frames are highly correlated, the noise estimation result of the noise estimation circuit 610 according to the cur and pre2 fields is suitable to be applied to the nxt1 field. Accordingly, the dynamic noise filter of the invention operates without additional buffers for temporarily storing the image data of the cur field and thus a large amount of hardware costs can be saved. During the period of the cur field, the parameters TP and SP fed into the TNR filter 620 are the noise estimation result generated by the noise estimation circuit 610 according to the pre1 and pre3 fields during the period of the pre1 field. Similarly, in this embodiment, the estimation result generated by the motion estimation circuit 650 according to the cur and pre2 fields will be applied to the nxt2 field while the mosquito flag mnr_rgn and the amount of movement MBW fed into the SNR filter 630 are the motion estimation result generated by the motion estimation circuit 650 according to the pre2 and pre4 fields during the period of the pre2 field. In an alternative embodiment, the estimation result generated by the motion estimation circuit 650 according to the cur and pre2 fields is applied to the nxt1 field while the mosquito flag mnr_rgn and the amount of movement MBW fed into the SNR filter 630 are the estimation result generated by the motion estimation circuit 650 according to the pre1 and pre3 fields during the period of the pre1 field.

Based on the above reasons and the purpose of synchronization, two delay circuits 661 and 662 are provided in the embodiments of FIGS. 6A and 6B. The delay circuit 661 delays its input for one-field or two-field periods while the delay circuit 662 delays its input for one field period. In one embodiment, the dynamic noise filter 600 operates without any delay circuit and the noise estimation circuit 610 and the motion estimation circuit 650 temporarily store the current estimation result in a system buffer (not shown). While image data related to the nxt1 field is to be inputted to the dynamic noise filter 600, the noise estimation circuit 610 reads out the parameters TP and SP from the system buffer and transmits them to the TNR filter 620 and the SNR filter 630; while image data related to the nxt2 field is to be inputted to the dynamic noise filter 600, the motion estimation circuit 650 reads out the mosquito flag mnr_rgn and the amount of movement MBW from the system buffer and transmits them to the SNR filter 630. Therefore, the delay circuits 661 and 662 in FIGS. 6A and 6B are not essential elements and represented in dotted lines. The above embodiments in FIGS. 6A and 6B are described as being applied to the continuous fields. It should be noted that the circuits of FIGS. 6A and 6B can be applied to the continuous frames as well, except that the delay circuits 661 and 662 both delay their inputs for one frame period only.

Figures 7A, 13:
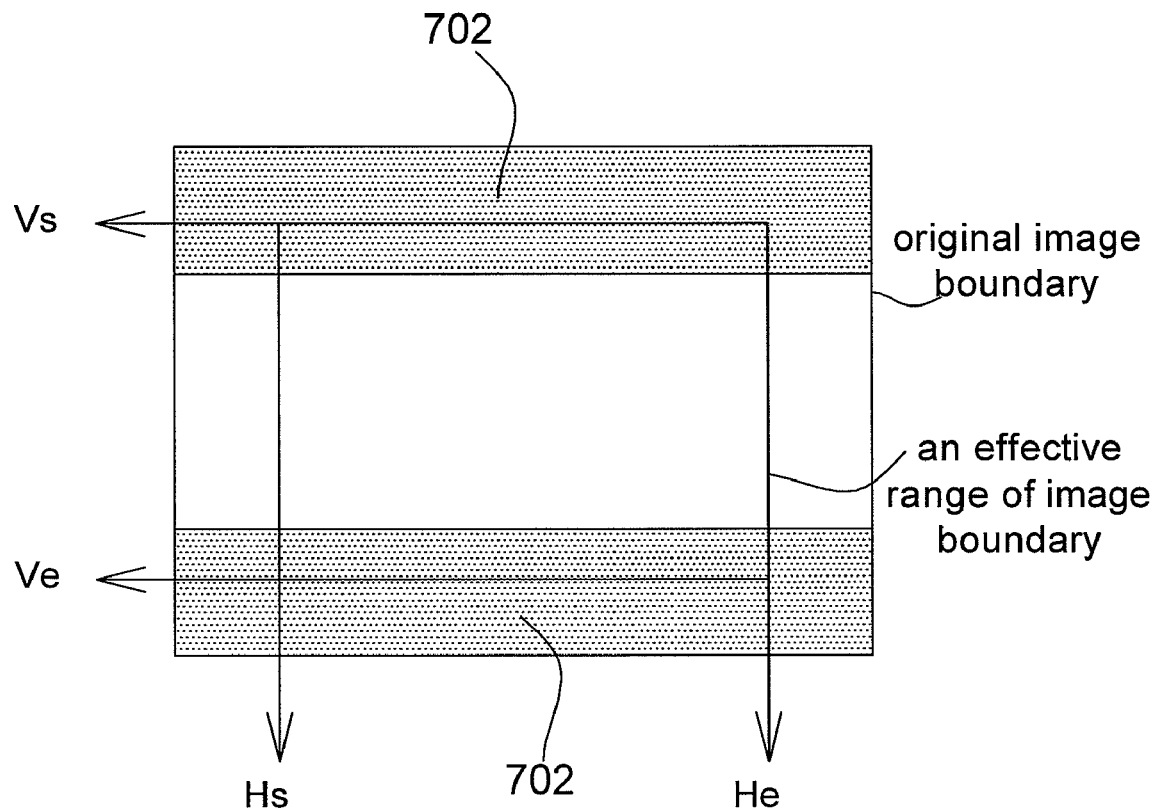
FIG. 7A shows the relationship of the original image boundary and the effective range of image boundary enclosed by Vs, Ve, Hs, and He.
FIG. 13 shows the relationship of the luminance and position of a 3×3 block having a target pixel (i,j) as the center.
Figures 7B, 7C:
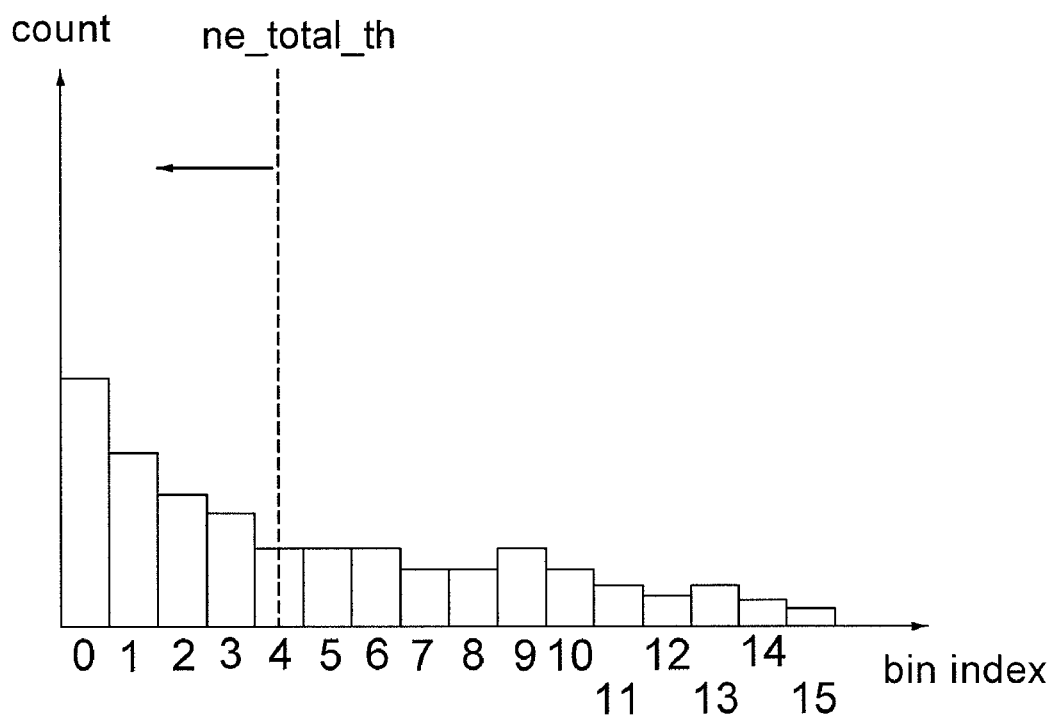
FIG. 7B shows a diagram of a 3×5 block expanded from a target pixel (i,j) by a noise estimation circuit 610.
FIG. 7C shows one example of a noise histogram.

According to one embodiment, during noise estimation, within an effective range of image boundary enclosed by Vs, Ve, Hs, and He as shown in FIG. 7A, the noise estimation circuit 610 treats each target pixel as the center and expands it to a 3×5 block; for example, a target pixel at the coordinate (i,j) is expanded to a 3×5 block as shown in FIG. 7B. Assuming that noise has low amplitude in the invention, during noise estimation, the noise estimation circuit 610 excludes motion blocks (with large luminance difference) in the field and blocks (with little luminance difference) located in black bar regions 702 according to the sum of absolute luminance differences for each 3×5 block. Then, a noise histogram is generated according to the maximum absolute value of luminance difference of one pixel of each static block not located in the black bar regions 702. For example, according to one embodiment of the invention, the following program codes are provided to generate the noise histogram in FIG. 7C. The noise histogram in FIG. 7C consists of a plurality of bins, where each bin index represents one of the maximum absolute luminance differences (from 0 to 15) and the vertical axis represents the corresponding accumulated count of each bin. The 3×5 block having the maximum absolute luminance difference more than 15 is counted in bin(15).

```
for i = Vs : Ve
    for j = Hs: He
        pixel_diff(i, j) = abs(pixel(pre2, i, j) – pixel(cur, i,
        j)) . . . (2)
        /*calculate the absolute luminance difference of the target
        pixel (i, j) according to the cur and pre2 fields */
    end
end
for i = Vs : Ve
    for j = Hs: He
```

$$bk\_diff(i, j) = \sum_{\substack{-1 \le m \le 1 \\ -2 \le n \le 2}} pixel\_diff(i + m, j + n)$$

```
        /*calculate the sum of absolute luminance difference
        for each block*/
        if ((bk_diff(i, j) >= reg_th1 && pixel(cur, i, j) >=
        reg_th2 &&
            bk_diff(i, j) <= reg_th3)
            /*determine if it is a static block located in the black
            bar regions*/
            max_diff = 0
            for x = –2:2
                for y = –1:1
                    if (max_diff < pixel_diff(i + y, j + x))
                        max_diff = pixel_diff(i + y, j + x);
                        /*searching for a pixel having the maximum
                        absolute luminance difference in the 3 × 5 block*/
                    end
                end
            end
            if (max_diff > 15)
                max_diff = 15;
            end
            hist(max_diff) =hist(max_13duff) +1;
            /*the count of each bin is accumulated*/
        end
    end
end
```

Those who are skilled in the art will appreciate that the noise at low level will be magnified as well if the whole noise level of one field is relatively large. Therefore, determining the whole noise level of one field does not need to check each image data of the whole field but needs to sample only several pixels having the several lowest noise levels. In one embodiment, the noise estimation circuit 610 samples 2% of the pixels having the several lowest noise levels in one field. The following program codes are provided to calculate the noise mean u and the noise variance v.

```
ne_total_th = 2% * (He – Hs) * (Ve – Vs)
/*calculate the total number of 2% of pixels in one field*/
    count = 0; bincount = 0; sum = 0;
    sum2 = 0; enough_sample = 0;
    for i=0:15 begin
        count = count + bin(i)
        if(count >= ne_total_th)
            /*the accumulation of counts is more than or equal to the total
            number of 2% of pixels*/
            bincount = ne_total_th+bin(i)– count;
            count = ne_total_th;
            enough_sample = 1;/*meaning the number of samples is
            enough*/
        end
        else
            bincount = bin(i)
        end
        sum = i * bincount + sum;
        sum2 = i^2 * bincount + sum2;
        if(enough_sample) break; /*meaning the number of samples
        reaches 2%*/
    end
    u = sum / count;   /*calculate the noise mean */
    v = sum2 /count;   /* calculate the noise variance */
```

In terms of the example shown in FIG. 7C, the noise estimation circuit 610 firstly determines whether the number of samples accumulated from bin(0) to bin(15) is more than the total number of 2% of pixels (ne_total_th). The dotted line in the figure represents that the number of samples accumulated from bin(0) to bin(4) reaches the total number of 2% of pixels (ne_total_th). There is a possibility that the number of samples accumulated from bin(0) to bin(15) is still less than ne_total_th, meaning that the total number of samples is not enough. Such condition occurs when (1) a scene changes or (2) a scene is completely motionless and very clean. If the above two scenes occur, it is not necessary to process the cur field for noise reduction and the values u and v.

Regarding a series of continuous fields supplied to the noise estimation circuit 610, some fields may have enough samples but others do not, which thus affects the reliability of the currently calculated values u and v. In one embodiment, according to the number (stable_cnt) of fields having enough samples in the past 16 fields, the noise estimation circuit 610 uses the following equations to obtain the reliable noise mean u and the reliable noise variance v:

$$u=(u*\text{stable\_}cnt+u\_ref*(16-\text{stable\_}cnt))/16; \text{ and}$$

$$v=(v*\text{stable\_}cnt+v\_ref*(16-\text{stable\_}cnt))/16.$$

Referring to the above equations, u_ref and v_ref are the initial values of u and v of the system if the number of samples in a field is not enough. The closer the number (stable_cnt) is to 16, the greater the number of fields having enough samples in the past 16 fields and the higher the reliability of the currently calculated noise mean u and the currently calculated noise variance v.

According to the amount of noise contained in each field, the corresponding values u and v are calculated by the noise estimation circuit 610 and then are used to dynamically adjust the strengths of the TNR filter 620 and the SNR filter 630. On average, a field having a higher noise mean u and a higher noise variance v usually contains stronger noise; in contrast, it usually needs the TNR filter 620 and the SNR filter 630 having greater filtering ability.

In one embodiment, the following infinite impulse response (IIR) equations are provided to obtain the averaged spatial parameters lpu_snr and lpb_snr, where a parameter ne_alpha is a preset value less than 16:

$$lpu\_snr=(u*ne\_\text{alpha}+lpu\_snr*(16-ne\_\text{alpha}))/16; \quad (3)$$

$$lpv\_snr=(v*ne\_\text{alpha}+lpv\_snr*(16-ne\_\text{alpha}))/16. \quad (4)$$

In the conventional applications, it is common that a moving object creates trailing effect while a conventional TNR is applied and a static object creates blurred effect while a conventional SNR is applied. In view of the above problem, the invention realizes noise reduction by applying the TNR filter to static images and the SNR filter to motion images, thus obtaining better image quality. Therefore, the noise estimation circuit 610 determines whether the cur field as a whole is close to a static field or a motion field by calculating the total number of pixels diff_cnt having the absolute luminance difference pixel_diff(i,j) (referring to the definition of the equation (2)) greater than a threshold value ne_th1 according to the cur field and the pre2 field. In one embodiment, if the number diff_cnt is less than a threshold value ne_th2, it indicates that the cur field is close to an extra-static field. If the number diff_cnt is more than the threshold value ne_th2 but less than a threshold value ne_th3 (ne_th3>ne_th2), it indicates that the cur field is close to a static field; otherwise, the whole curfield is close to a motion field. After determining whether the cur field is close to a static field, an extra-static field, or a motion field, the noise estimation circuit 610 modifies the magnitude of the values u and v by using parameters extra_u and extra_v according to equation (5). Specifically, the more static the field, the greater the parameters extra_u and extra_v. In one embodiment, the following IIR equations (6) and (7) are provided to obtain the averaged temporal parameters lpu and lpv:

$$u=u+\text{extra\_}u; v\_f=v\_f+\text{extra\_}v; \quad (5)$$

$$lpu=(u*ne\_\text{alpha}+lpu*(16-ne\_\text{alpha}))/16; \quad (6)$$

$$lpv=(v*ne\_\text{alpha}+lpv*(16-ne\_\text{alpha}))/16; \quad (7)$$

It should be noted that the adjustment to u and v in equation (5) can not be fed back to affect the above spatial parameters lpu_snr and lpv_snr of equations (3) and (4) but affects the above temporal parameters lpu and lpv. Therefore, through equation (5), as the cur field tends to be more static, the parameters u and v are modified to be greater to cause the TNR filter 620 to have greater filtering ability. It is because, as the cur field is getting more static, it is allowed to increase the filtering ability of the TNR filter 620 but not allowed to affect the SNR filter 630 (or the spatial parameters lpu_snr and lpv_snr).

Figure 8:
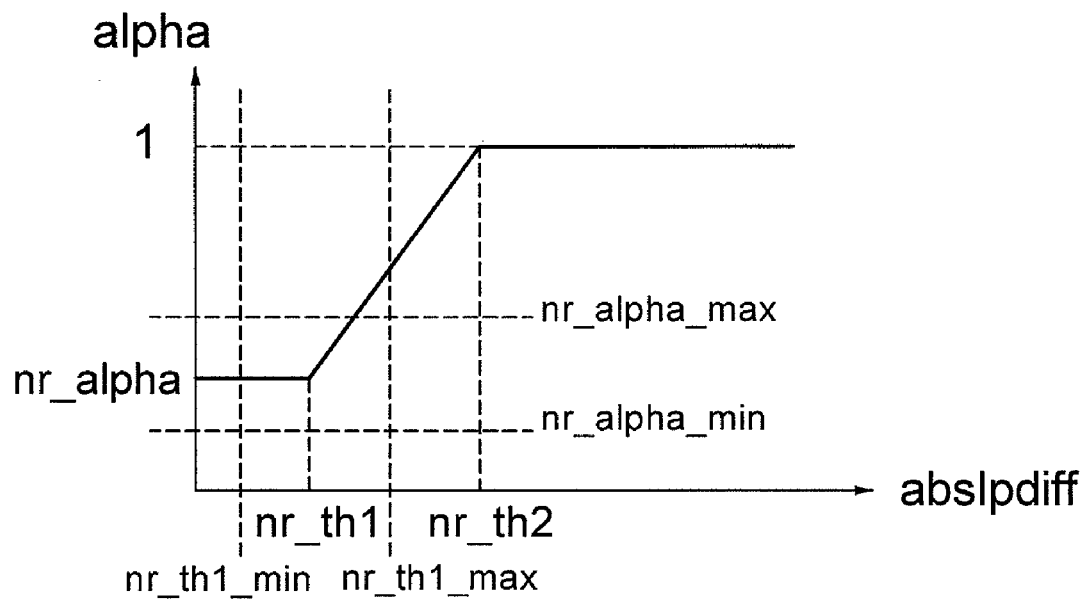
FIG. 8 shows a characteristic curve of the TNR filter according to the invention.

FIG. 8 shows a characteristic curve of the TNR filter according to the invention. The noise estimation circuit 610 uses the above temporal parameters lpu and lpv to generate the temporal attribute parameter TP (nr_alpha and nr_th1) of the characteristic curve of the TNR filter in FIG. 8. In one embodiment, the noise estimation circuit 610 uses the following program codes according to the temporal parameters lpu and lpv to generate the temporal attribute parameters nr_alpha and nr_th1:

$$nr\_\text{alpha}=nr\_\text{alpha}-(lpv-v\_ref)*\text{alpha\_fact};$$

$$nr\_th1=nr\_th1+(lpu-u\_ref)*th1\_\text{fact};$$

/*v_ref, u_ref, alpha_fact and th1_fact are all preset values*/.

It can be seen from the above program codes that nr_alpha is less as the noise variance is getting greater (i.e., lpv is getting greater); besides, nr_th1 is greater and the filtering ability of the TNR filter is stronger as the noise mean is getting greater (i.e., lpu is getting greater). According to the invention, in practice, each of the parameters nr_alpha and nr_th1 is offered a dynamical range of modification. For example, as shown by the dotted lines in FIG. 8, nr_alpha is adjusted in the range of nr_alpha_min to nr_alpha_max while nr_th1 is adjusted in the range of nr_th_min to nr_th1_max. Then, at the beginning of the next field period, the noise estimation circuit 610 supplies the above temporal attribute parameter TP (nr_alpha and nr_th1) to the TNR filter 620 for dynamic modification of its TNR characteristic curve, as shown in FIG. 8.

According to the invention, the slope of the slanted line in FIG. 8 is fixed and the distance between nr_th1 and nr_th2 is also fixed. Therefore, after the TNR filter 620 receives the updated temporal attribute parameters nr_alpha and nr_th1, nr_th2 is varied horizontally according to nr_th1. As for the embodiment in FIG. 6A, the TNR filter 620 consists of three 1×N TNR filtering units 621~623 and the above dynamically modified characteristic curve of the TNR filter of FIG. 8 is applicable to each 1×N TNR filtering unit (621~623). The horizontal axis in FIG. 8 is defined as the sum of low-pass filtered luminance differences between the cur field and the pre2 field for each pixel in a m×n block expanded from a target pixel (i,j) as the center:

$$abslpdiff(i,\ j) = \sum_{\substack{-m/2 \le y \le m/2 \\ -n/2 \le x \le n/2}} (\text{pixel}(cur,\ i+y,\ j+x) - \text{pixel}(pre2,\ i+y,\ j+x)) * w(y,x),$$

where $$\sum_{\substack{-m/2 \leq y \leq m/2 \\ -n/2 \leq x \leq n/2}} w(y, x)$$

is a m×n low-pass filter and the m×n block does not have to be as large as the block in FIG. 7B. Here, the value m depends on the number of scan lines fed into each TNR filtering unit. In the embodiment of the TNR filtering units 621~623, m is equal to 1.

As the TNR characteristic curve in FIG. 8 is compared to that in FIG. 1A, the horizontal axis of the traditional TNR characteristic curve uses the luminance difference of one single pixel as the reference value while the horizontal axis of the TNR characteristic curve according to the invention uses the sum of low-pass filtered luminance differences (abslpdiff (i,j)) of one single block as the reference value. Thus, according to the invention, it is easier to identify that the cause of luminance difference is either from motion or noise. If it is determined that the cause of luminance difference is from motion, the strength of the SNR filter 630 will be increased correspondingly. For example, after using a target pixel (i,j) as the center and expanding into a m×n block, the 1×N TNR filtering unit 622 calculates the sum abslpdiff(i,j) and then obtains a corresponding value alpha(i,j) according to the characteristic curve in FIG. 8. The amount of movement of the target pixel (i,j) is determined by the magnitude of the value alpha(i,j). For example, as alpha(i,j) is getting greater, the amount of movement related to the target pixel (i,j) is greater. Then, according to the obtained value alpha(i,j), the 1×N TNR filtering unit (621~623) uses equation (1) to blend two pixel values of the target pixel (i,j) in the cur field and the pre2 field (that is, blending C(i,j) and P(i,j)) to generate an output pixel value T(i,j) (including luminance Y and chrominance C) and then transmits t_alpha(i,j) (=alpha(i,j)−nr_alpha) related to the pixel value T(i,j) to the SNR filter 630 for dynamic modification of its filtering ability. According to the invention, as t_alpha(i,j) is getting greater, the corresponding filtering ability of the SNR filter 630 is greater.

Figure 9:
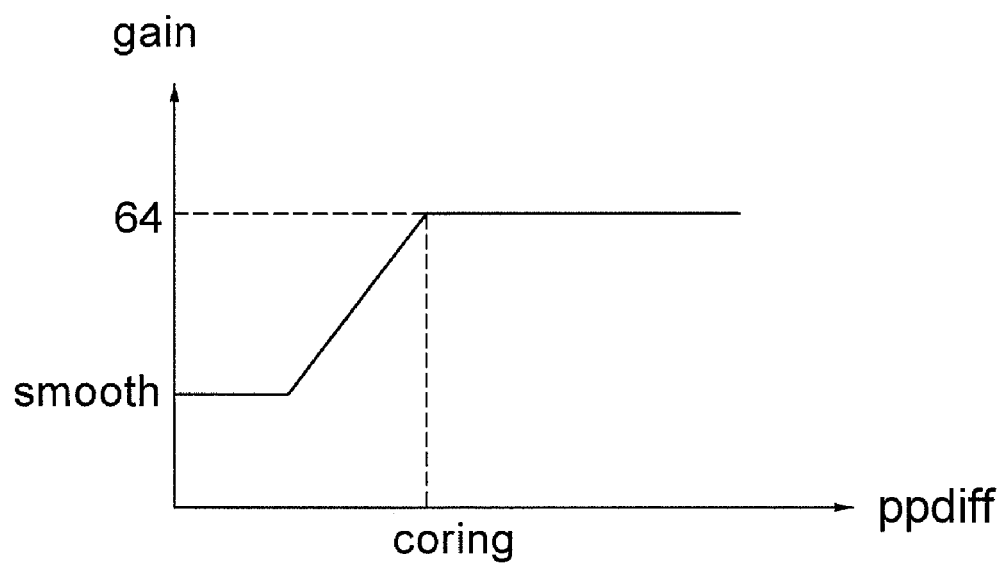
FIG. 9 shows a characteristic curve of the SNR filter according to the invention.

FIG. 9 shows a characteristic curve of the SNR filter according to the invention. According to the embodiment in FIG. 6A, the SNR filter 630 is implemented using a vertical horizontal filter. The vertical horizontal filter includes a vertical SNR filtering unit 631 and a horizontal SNR filtering unit 632. The characteristic curve in FIG. 9 is applicable to both the vertical SNR filtering unit 631 and the horizontal SNR filtering unit 632. The vertical axis of FIG. 9 represents the gain while the horizontal axis represents the difference ppdiff between the maximum value and the minimum value of a m×n block (expressed as bk(cur,i,j,m,n), this SNR block does not need to be as large as the TNR block) as a target pixel (i,j) being a center is expanded into the m×n block in the cur field. In one embodiment, the following program codes are provided to obtain the output of the SNR filtering unit:

maxvalue=max($bk$(cur,$i,j,m,n$));

/*the maximum value within the m×n block in the cur field*/ minvalue=min($bk$(cur,$i,j,m,n$));

/*the minimum value within the m×n block in the cur field*/

$pp$diff=maxvalue−minvalue; (8)

aug=$hpf$($bk$(cur,$i,j,m,n$));

/*quantified value aug indicating the degree of high-frequency in the m×n block*/ pixel_out($i,j$)=pixel_in($i,j$)−aug*(64−$g$)/32/64; (9)

/*the output pixel_out(i,j) of the SNR filtering unit is obtained after the input bk(cur,i,j,m,n) is fed into the SNR filtering unit*/

It should be noted that, unlike the modification of the TNR characteristic curve of FIG. 8, each of the vertical SNR filtering unit 631 and the horizontal SNR filtering unit 632 only adjusts the value coring of its own SNR characteristic curve without changing the initial gain value (smooth) and the slope of the slanted line according to the parameters generated by the noise estimation circuit 610 and the motion estimation circuit 650.

In one embodiment, after generating the spatial parameters lpu_snr and lpv_snr according to equations (3) and (4), the noise estimation circuit 610 generates the spatial attribute parameter SP (including vl_coring, vc_coring, hl_coring, and hc_coring) for transmitting them to the SNR filter 630 according to the following four equations:

vl_coring($i,j$)=$lpu\_snr*vl\_th1+lpv\_snr*vl\_th2$;

/*adjusting the value coring of the vertical SNR luminance characteristic curve*/ vc_coring($i,j$)=$lpu\_snr*vc\_th1+lpv\_snr*vc\_th2$;

/*adjusting the value coring of the vertical SNR chrominance characteristic curve*/ hl_coring($i,j$)=$lpu\_snr*hl\_th1+lpv\_snr*hl\_th2$;

/*adjusting the value coring of the horizontal SNR luminance characteristic curve*/ hc_coring($i,j$)=$lpu\_snr*hc\_th1+lpv\_snr*hc\_th2$;

/*adjusting the value coring of the horizontal SNR chrominance characteristic curve*/

It should be noted that the invention does not restrict the vertical SNR filtering unit 631 to being installed at the front end of the horizontal SNR filtering unit 632 in the SNR filter 630. A circuit designer can adjust the operating order according to application needs. In another embodiment of the SNR filter 630, three horizontal SNR filtering units 632 are installed at the front end of the vertical SNR filtering unit 631 (not shown).

Figure 10B:
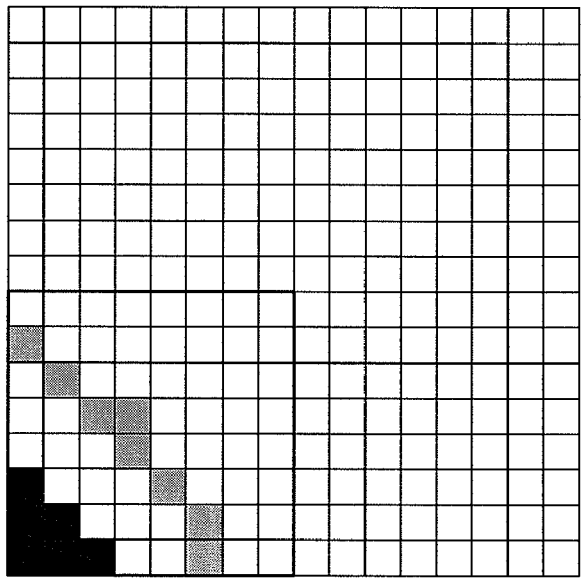
FIG. 10B shows another example of a relation between the strong edge and the mosquito noise.
Figure 10A:
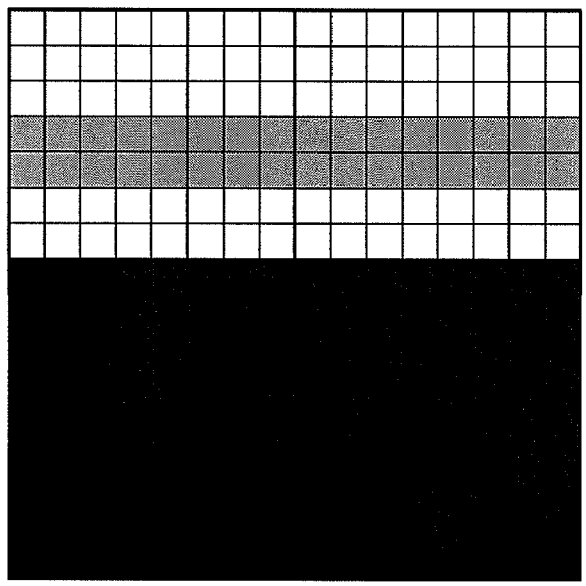
FIG. 10A shows an example of a relation between the strong edge and the mosquito noise.

On the other hand, mosquito noise (as shown in FIG. 10A and FIG. 10B) is common around strong edge regions of ordinary images. It is caused by discrete cosine transformation (DCT) during image compression. According to the invention, as long as there is a strong edge region detected in the image, the strength of the SNR filter 630 will be modified to improve or even solve the mosquito noise problem. Mosquito noise can be divided into static mosquito noise and motion mosquito noise. Generally, the static mosquito noise is recognized easily by human eyes and has to be improved immediately; in contrast, whether to filter out the motion mosquito noise depends on application needs.

Figure 10C:
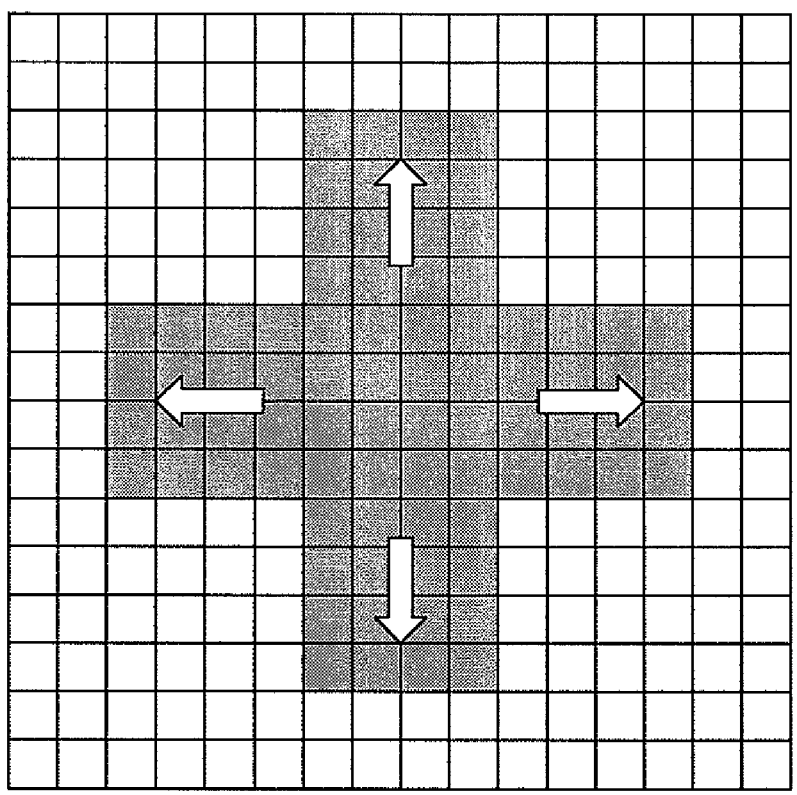
FIG. 10C shows a crisscross mosquito noise region that is expanded from a center block having a strong edge.

The motion estimation circuit 650 determines whether there is a strong edge region in a 4×4 block (or an 8×8 block or a 4×8 block) at the same coordinate between the cur field and the pre2 field. For example, if the difference ppdiff (referring to the definition of equation (8)) between the maximum value of luminance difference and the minimum value of luminance difference in the 4×4 block including a target pixel (i,j) is more than a threshold value mnr_th, the motion estimation circuit 650 will determine that there is a strong edge region in the 4×4 block. If the 4×4 block having a strong edge region is detected, the 4×4 block is treated as the center block and then expanded into a crisscross mosquito noise region, as shown in FIG. 10C. In another embodiment, the 4×4 block as the center block is expanded into a 12×12 square mosquito noise region (not shown). Accordingly, in the motion estimation circuit 650, the mosquito flag of each pixel inside the crisscross mosquito noise region is set to 1, i.e., mnr_rgn(y, x)=1. The motion estimation circuit 650 performs motion estimation over each 4×4 mosquito noise block inside the crisscross mosquito noise region between the cur field and the pre2 field so as to generate a corresponding amount of movement MBW for each 4×4 mosquito noise block. According to the above description, the results of mosquito flag setting and motion estimation performed by the motion estimation circuit 650 according to the cur field and the pre2 field are applied to the nxt2 field. The mosquito noise blocks (marked with the flag mnr_rgn(y,x)) and their corresponding amount of movement MBW currently fed into the SNR filter 630 are the results of mosquito flag setting and motion estimation performed by the motion estimation circuit 650 according to the pre2 and pre4 fields two field periods ago.

After receiving the spatial attribute parameters vl_coring, vc_coring, hl_coring and hc_coring, the vertical SNR filtering unit 631 and the horizontal SNR filtering unit 632 further modify the parameters vl_coring, vc_coring, hl_coring and hc_coring of the SNR characteristic curve according to (1) whether the target pixel (i,j) belongs to a mosquito noise block (or whether the mosquito flag of the target pixel (i,j) is set to 1) and (2) the amount of movement MBW of the mosquito noise block. In one embodiment, assuming that the static mosquito noise is to be filtered out in the image, at first the vertical SNR filtering unit 631 and the horizontal SNR filtering unit 632 determine whether the target pixel (i,j) belongs to a mosquito noise block or not (that is, mnr_rgn(i, j)=1) and determine whether the amount of movement MBW of the mosquito noise block is less than a threshold value mbw_th. If the above two conditions are both satisfied, the parameters vl_coring, vc_coring, hl_coring, and hc_coring of the SNR characteristic curve are varied according to the following equations and the parameter s_alpha(i,j) is also adjusted meanwhile.

$$vl\_coring(i,j)=vl\_coring(i,j)+mnr\_rgn(i,j)*mnr\_vl\_coring;$$

/*while mosquito noise exists, vl_coring will be further increased*/

$$vc\_coring(i,j)=vc\_coring(i,j)+mnr\_rgn(i,j)*mnr\_vc\_coring;$$

/*while mosquito noise exists, vc_coring will be further increased*/

$$hl\_coring(i,j)=hl\_coring(i,j)+mnr\_rgn(i,j)*mnr\_hl\_coring;$$

/*while mosquito noise exists, hl_coring will be further increased*/

$$hc\_coring(i,j)=hc\_coring(i,j)+mnr\_rgn(i,j)*mnr\_hc\_coring;$$

/*while mosquito noise exists, hc_coring will be further increased*/

$$s\_alpha(i,j)=t\_alpha(i,j)+mnr\_rgn(i,j)*mnr\_gain;$$

/*while mosquito noise exists, t_alpha will be further increased to be s_alpha*/

According to FIG. 6A, the SNR filter 630 receives three scan lines T(i−1), T(i), and T(i+1) from the TNR filter 620 and expands a target pixel T(i,j) being a center into a m×n block. According to the four adjusted SNR characteristic curves (the vertical SNR luminance characteristic curve, the vertical SNR chrominance characteristic curve, the horizontal SNR luminance characteristic curve and the horizontal SNR chrominance characteristic curve), the SNR filter 630 obtains the different gain values g and then uses equation (9) to obtain the output pixel value S(i,j) (including its luminance component Y and its chrominance component C) and its corresponding parameter s_alpha(i,j).

Finally, the blending circuit 640 blends the pixel values T(i,j) and S(i,j) according to s_alpha(i,j) to thereby generate the output pixel value B(i,j). In one embodiment, the blending circuit 640 generates the output pixel value B(i,j) according to the following equation:

$$B(i,j)=S(i,j)\times s\_alpha(i,j)+T(i,j)\times(1-s\_alpha(i,j)).$$

Figure 11:
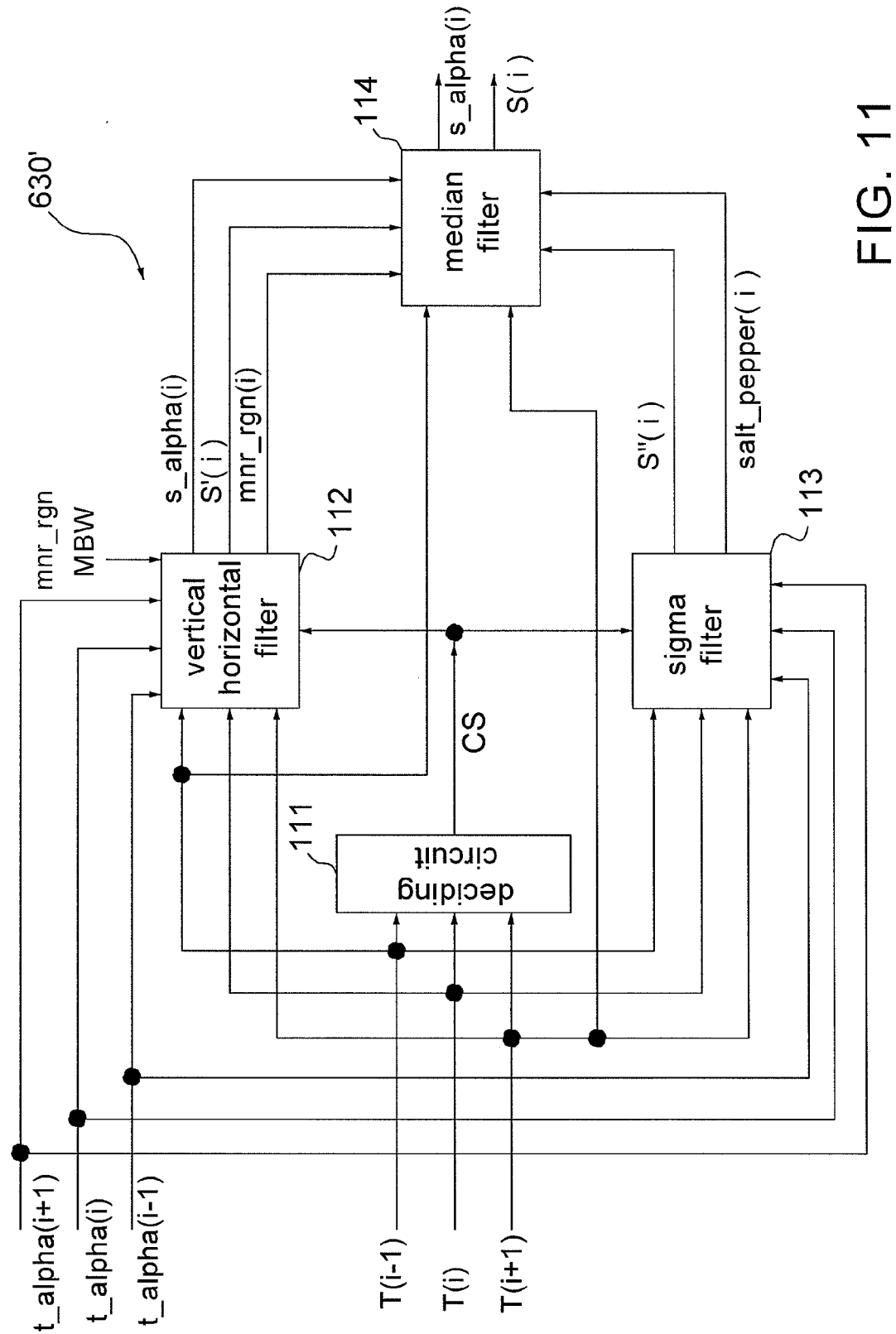
FIG. 11 shows a schematic circuit diagram of the SNR filter according to another embodiment of the invention.

It should be noted that the SNR filter 630 according to the invention can also be implemented using the circuit of FIG. 11 in addition to one single vertical horizontal filter. FIG. 11 shows a schematic circuit diagram of the SNR filter according to another embodiment of the invention. Referring now to FIG. 6A and FIG. 11, the SNR filter 630' according to the invention includes a vertical horizontal filter 112, a decision circuit 111, a sigma filter 113, and a median filter 114. The decision circuit 111 receives three scan lines T(i−1), T(i), and T(i+1) from the TNR filter 620 and then activates the vertical horizontal filter 112 or the sigma filter 113 according to whether the difference ppdiff (referring to the definition of equation (8)) in a block unit (for example, a 3×3 block) is more than a preset edge value edge_th. If the difference ppdiff is less than the threshold value edge_th, the decision circuit 111 activates the vertical horizontal filter 112 and disables the sigma filter 113 via a control signal CS. On the contrary, if the difference ppdiff is more than or equal to the threshold value edge_th, the decision circuit 111 activates the sigma filter 113 and disables the vertical horizontal filter 112 via the control signal CS. Since the structure and operations of the vertical horizontal filter 112 has been described above, the details will not be given hereinafter.

Figure 12A:
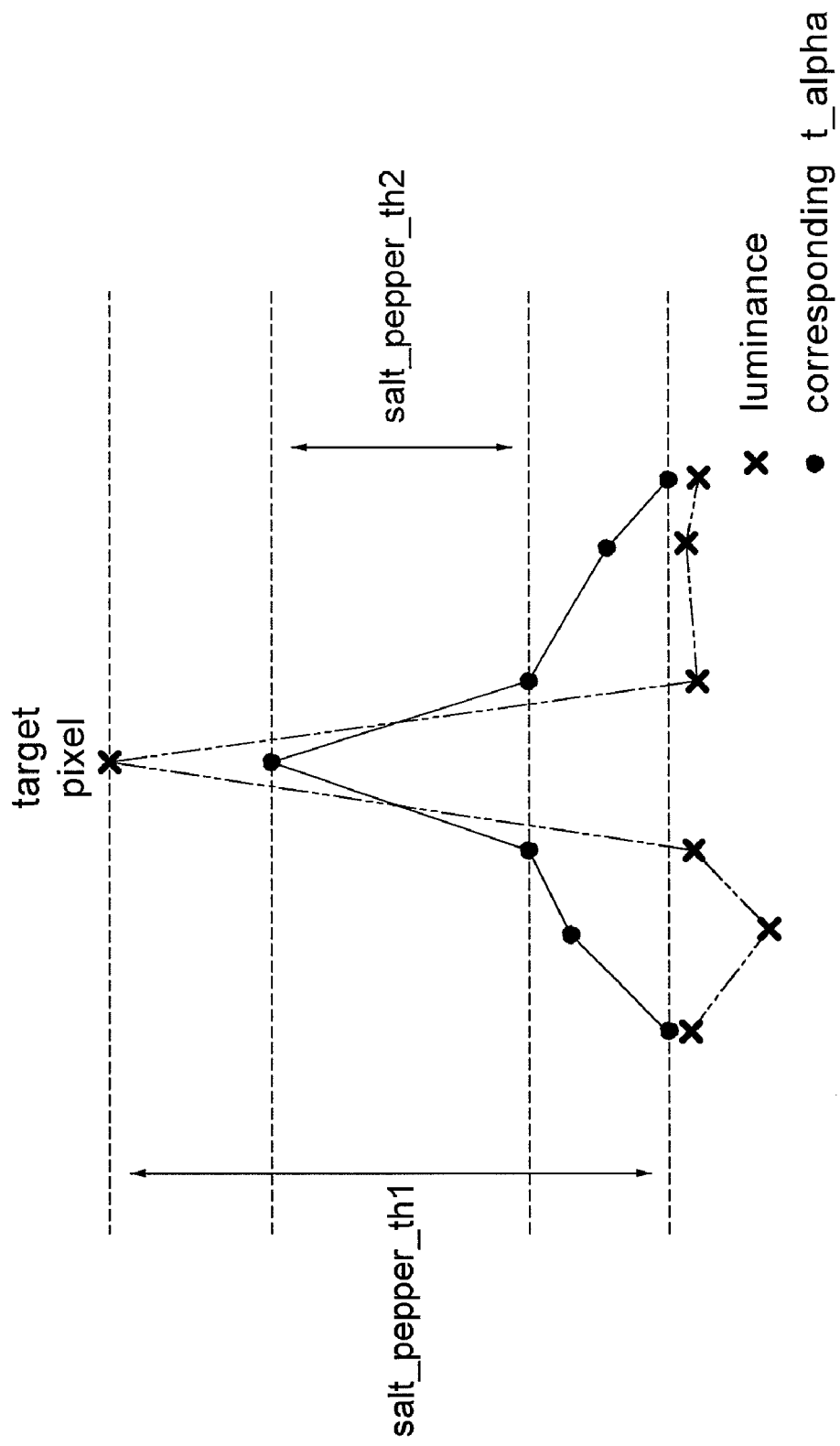
FIG. 12A shows one example of the relationship of the luminance, s_alpha, and positions of seven pixels.

FIG. 12A shows an exemplary relationship of luminance, t_alpha, and positions of seven pixels. Two features of salt-and-pepper noise are that the luminance (or chrominance) of a salt-and-pepper noise is generally the maximum or minimum in a block and the amount of movement related to the salt-and-pepper noise is generally the maximum in the block (t_alpha regarded as an indicator). For example, a target pixel in FIG. 12A is determined to be a salt noise if its luminance is the maximum and its amount of movement is the maximum (t_alpha is the maximum) in a block. On the contrary, a target pixel is determined to be a pepper noise if its luminance is the minimum and its amount of movement is the maximum in the block.

Figure 2A:
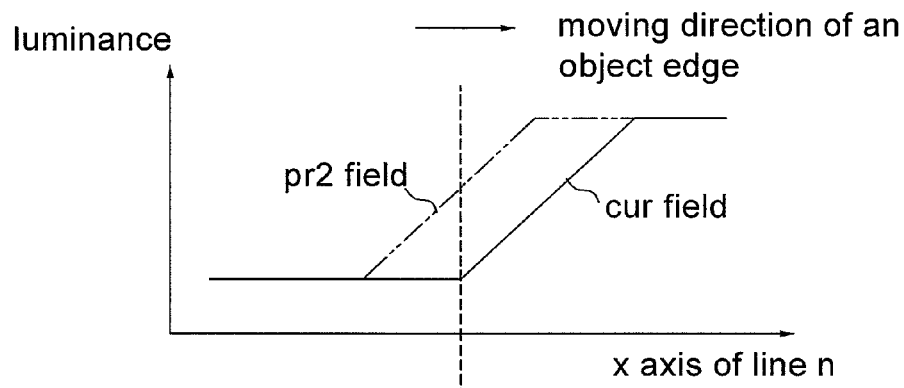
FIG. 2A shows relative positions of the edge of an object in the cur field and in the pre2 field when the amount of movement of the object is relatively small.
Figure 2B:
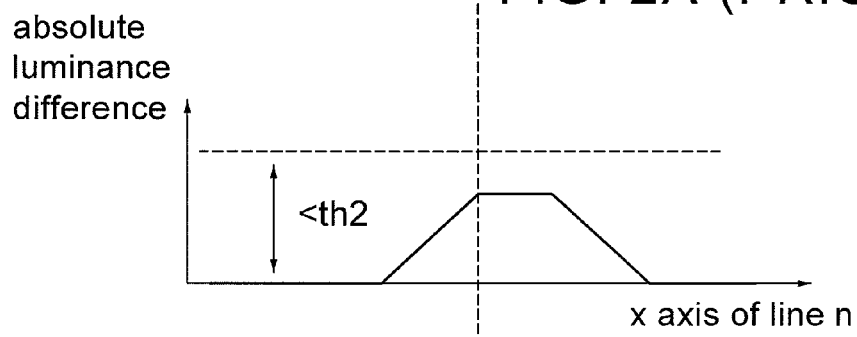
FIG. 2B shows the absolute luminance differences between the cur field and the pre2 field shown in FIG. 2A.
Figure 2C:
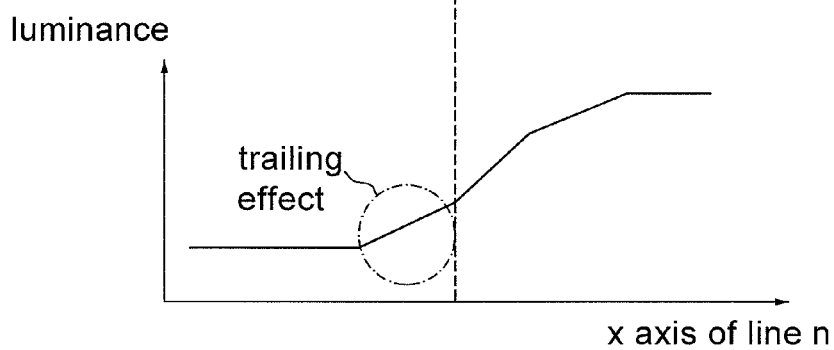
FIG. 2C shows a result after the characteristic curve in FIG. 1A is applied to the absolute luminance differences of FIG. 2B.
Figure 3A:
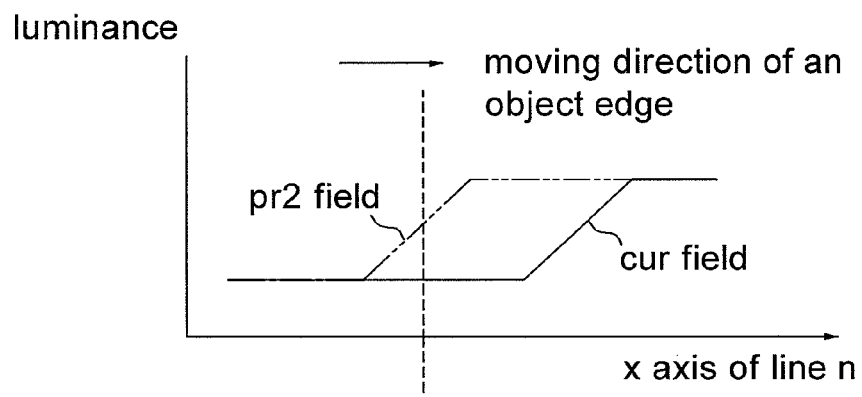
FIG. 3A shows relative positions of the edge of an object in the cur field and in the pre2 field when the amount of movement of the object is relatively large.
Figure 3B:
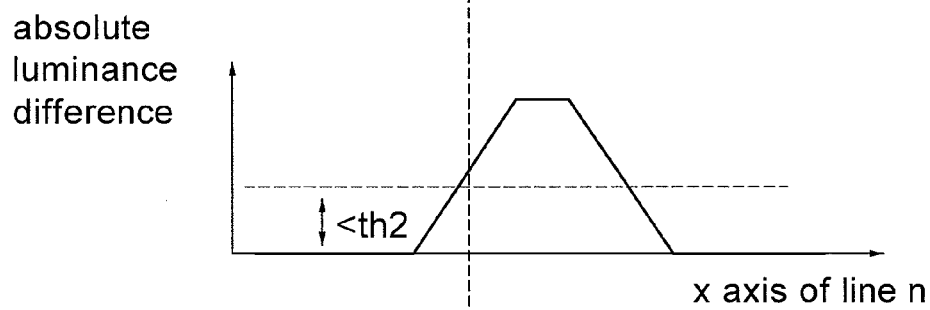
FIG. 3B shows the absolute luminance differences between the cur field and the pre2 field shown in FIG. 3A.
Figure 3C:
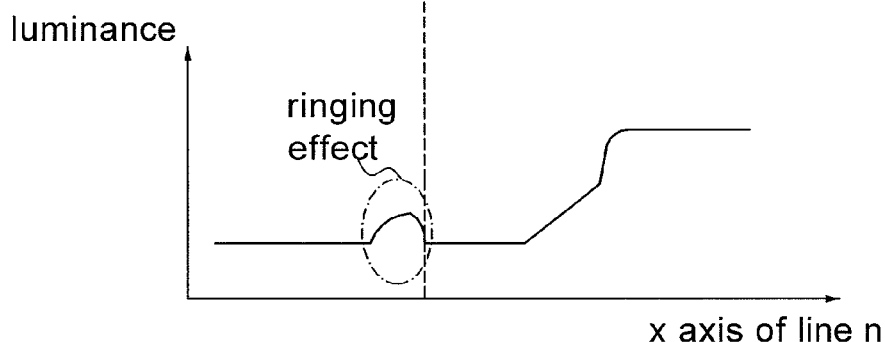
FIG. 3C shows a result after the characteristic curve in FIG. 1A is applied to the absolute luminance differences of FIG. 3B.
Figure 4A:
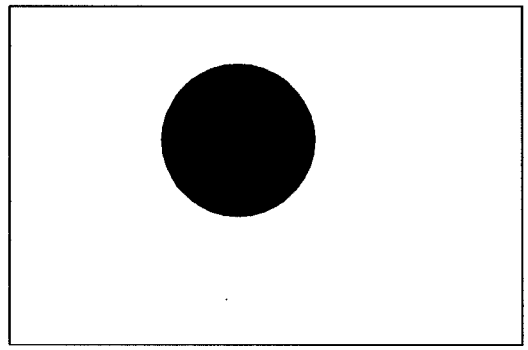
FIG. 4A shows a moving object in the pre2 field that has been processed by a conventional TNR filter.
Figure 4B:
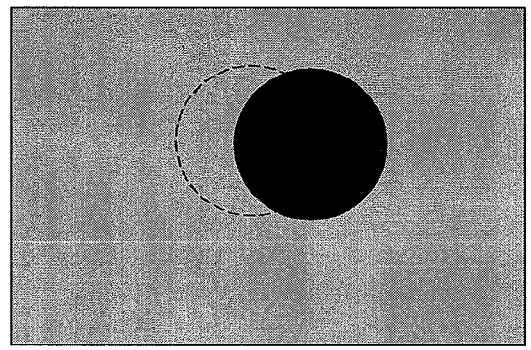
FIG. 4B shows the same moving object as that of FIG. 4A in the cur field which is not processed by the conventional TNR filter.
Figure 4C:
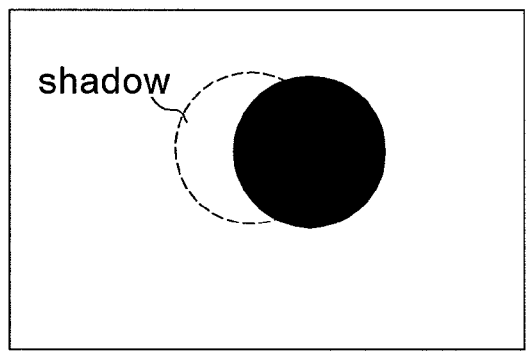
FIG. 4C shows the cur field that is processed by the conventional TNR filter.
Figure 5B:
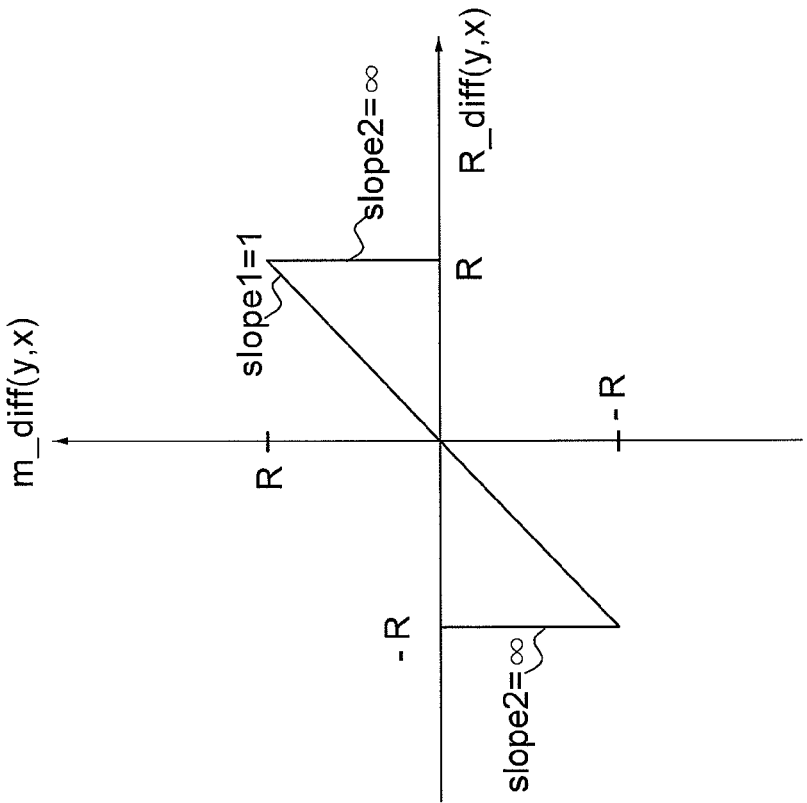
FIG. 5B shows the relationship of an actual luminance difference and a modified luminance difference according to a sigma filter in the prior art.
Figure 5A:
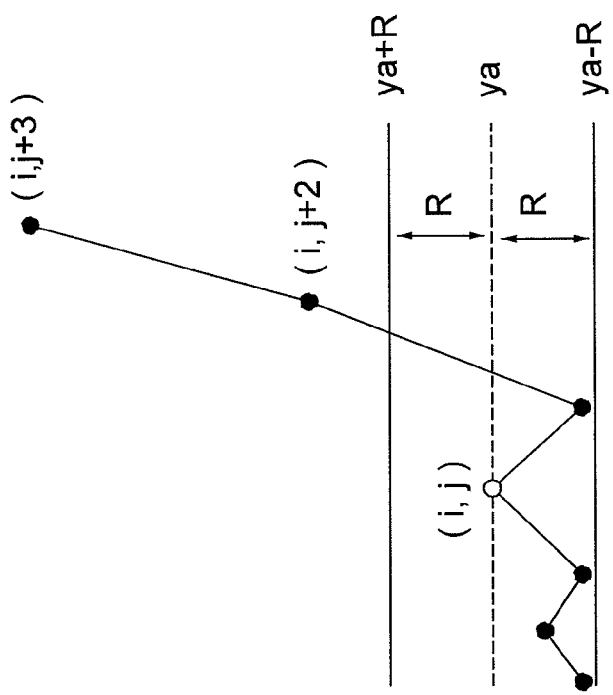
FIG. 5A is an example illustrating a luminance-position relationship for a plurality of pixels.
Figure 12B:
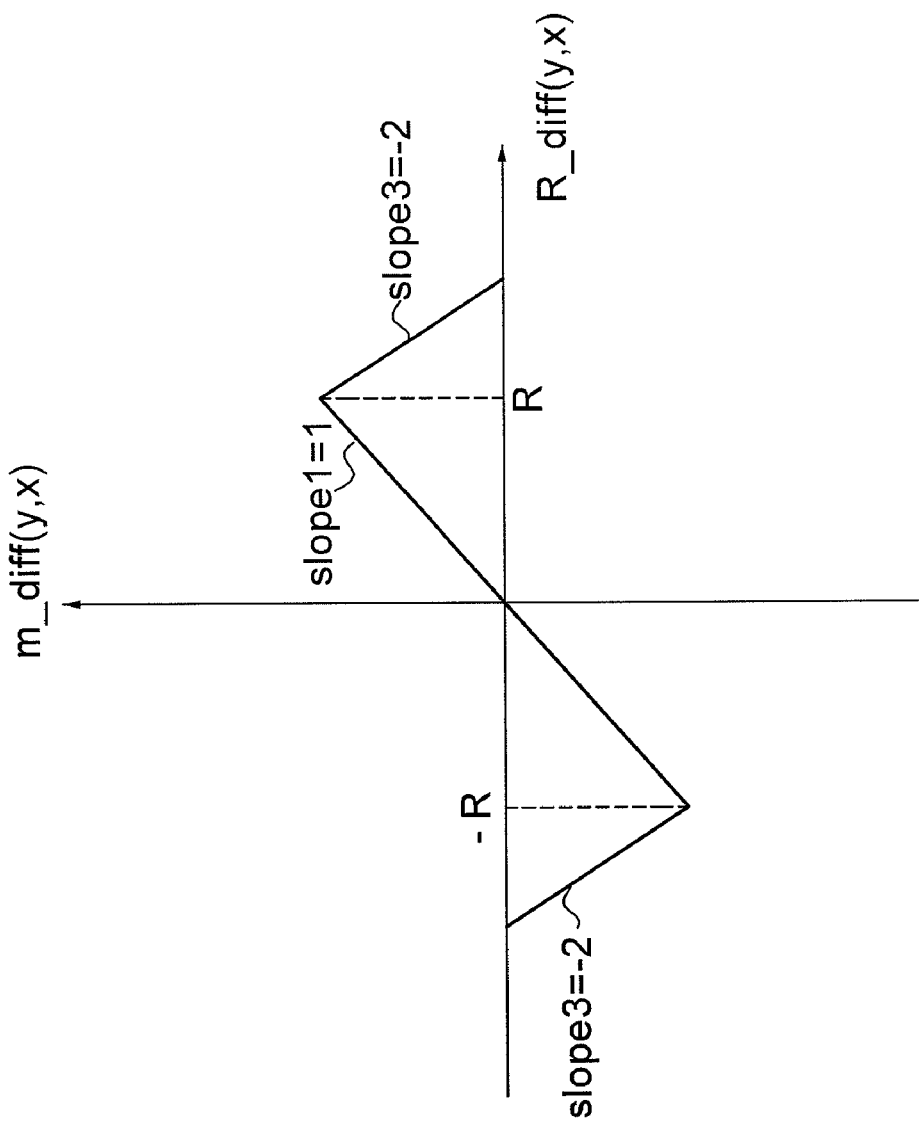
FIG. 12B shows the relationship of the actual luminance difference and the modified luminance difference according to the sigma filter of the invention.

FIG. 12B shows the relationship of the actual luminance difference and the modified luminance difference according to a sigma filter of the invention. Referring to FIG. 5B, the pixels having their luminance out of the luminance range (R~−R) set by the system are excluded from average calculation (∵slope2=∞) in the conventional sigma filter; in contrast, the sigma filter 113 according to the invention offers two negative slope region (slope3=−2) in FIG. 12B to the pixels having their luminance out of the luminance range (R~−R). The negative slope regions are treated as a buffer area and have the effect of maintaining a stable output image quality in the sigma filter 113 according to the invention.

In one embodiment, the sigma filter 113 receives the m×n block (the target pixel (i,j) is positioned at the center of the block) and uses the following program codes to generate an output pixel value S"(i,j) and its corresponding flag salt_pepper(i,j).

```
factor = 0.25; m2 = (m−1)/2; n2 = (n−1)/2; diffsum = 0;
spatial2_th = 1; /* factor is a preset value*/
salt_pepper_pos(i,j) = 1; salt_pepper_neg(i,j) = 1;
for y = i − m2 : i + m2
  for x = j − n2 : j + n2
    R_diff(y,x) = pixel(cur,y,x) − pixel(cur,i,j) ;
    /*actual luminance difference between a target pixel and its
    adjacent pixel*/
    diff_t_alpha(y,x) = t_alpha(i,j) − t_alpha(y,x);
    /*a difference between the value t_alpha of the target pixel(i,j) and
    the value t_alpha of its adjacent pixel(y,x) */
    if(abs(R_diff(y,x) > salt_pepper_th1 & (y != i) & (x!=j))
      salt_pepper_pos(i,j)=salt_pepper_pos(i,j) & (R_diff(y,x) < 0) &
      (diff_t_alpha(y,x) ≧ salt_pepper_th2);
      /* a pixel is a salt noise if it has the maximum luminance and the
      maximum t_alpha in the block*/
      salt_pepper_neg(i,j)=salt_pepper_neg(i,j)&
      (R_diff(y,x)  >  0) &(diff_t_alpha(y,x) ≧ salt_pepper_th2);
      /* a pixel is a pepper noise if it has the minimum luminance and
      the maximum t_alpha in the block */
    end
    if(R_diff(y,x)) > ppdiff * factor)
      m_diff(y,x)=ppdiff * factor+(R_diff(y,x)−
      (ppdiff * factor)) * slope3;
      /*slope3 is a negative slope*/
      if(R_diff(y,x) < 0)
        m_diff(y,x) = 0;
      end
    elseif (R_diff(y,x) < −ppdif * factor)
      m_diff(y,x)=−ppdiff * factor+(R_diff(y,x)−
      (ppdiff * factor))*slope3;
      /*slope3 is the negative slope*/
      if(R_diff(y,x) > 0)
        m_diff(y,x) = 0;
      end
    end
    diffsum = diffsum + m_diff(y,x);
  end
end
S"(cur,i,j) = pixel(cur,i,j) + diffsum*spatial2_th/(m*n−1) ;......(10)
/*the ouput value of sigma filter related to the target pixel (i,j)*/
salt_pepper(i,j)= salt_pepper_pos(i,j) | salt_pepper_neg(i,j);
/*If the flag salt_pepper(i,j) equals 1, its corresponding pixel (i,j) is a
salt-and-pepper noise*/
```

For the case of a 1×5 (m=1, n=5) block and the negative slope slope3=−2, if the luminance of five pixels in the 1×5 block is 100, 51, 25, 0, and 5 (assuming the middle pixel having a luminance of 25 is the target pixel), referring to FIG. 12B, R=ppdiff×factor=(100−0)×0.25=25 and thus the filtered output value of the sigma filter 113 is S"=25+(0+23−25−20)/4=20. Assuming there is some noise added to the five pixels of the 1×5 block, the luminance of the five pixels in the 1×5 block becomes 104, 50, 25, 0, and 5. According to the relation shown in FIG. 12B, R=(104−0)×0.25=26 and thus the filtered output value of the sigma filter 113 is S"=25+(0+25−25−20)/4=20. From the above outputs, even though there is some noise added to the 1×5 block, the filtered output value of the sigma filter 113 according to the invention maintains a stable output of 20.

Figure 12C:
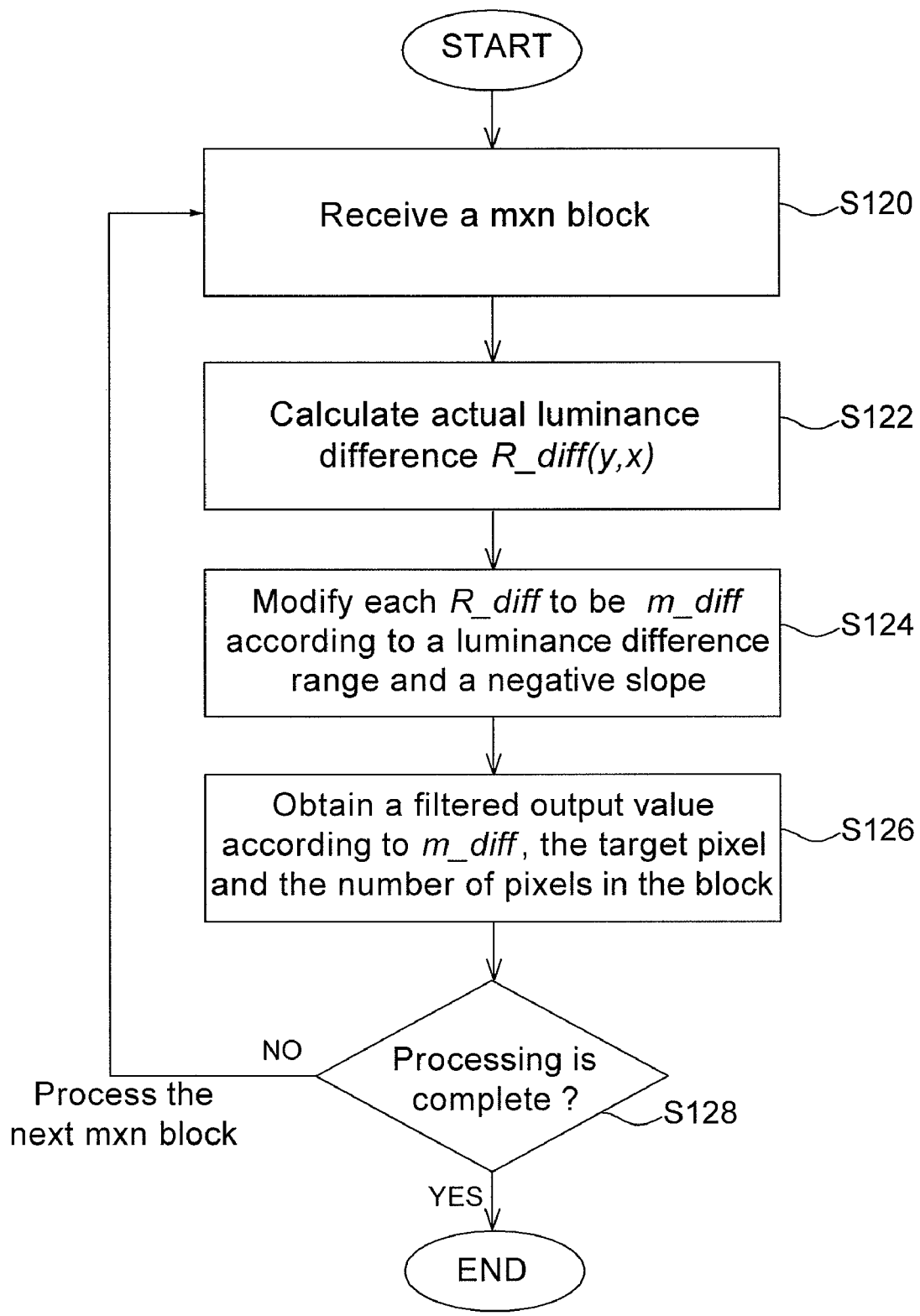
FIG. 12C shows a flow chart illustrating the sigma filtering method according to one embodiment of the invention.

FIG. 12C shows a flow chart illustrating the sigma filtering method according to one embodiment of the invention. Referring to FIG. 12C, according to one embodiment of the invention, the sigma filtering method for processing an image comprises the following steps:

Step S120: Receive a m×n block, where m is the number of rows and n is the number of columns.

Step 122: According to a target pixel (i,j) of the m×n block, calculate each actual luminance difference R_diff(y,x) between the target pixel (i,j) and each of the other pixels (y,x) in the m×n block, i.e., R_diff(y,x)=pixel(cur,y,x)−pixel(cur,i,j).

Step S124: Modify each actual luminance difference R_diff to be a corresponding modified luminance difference m_diff according to a predetermined luminance difference range of R to (−R) and a predetermined negative slope slope3.

Step S126: Obtain a filtered output value according to each modified luminance difference m_diff, the luminance of the target pixel (i,j), and the number of pixels in the m×n block. For example, the filtered output value S"(cur,i,j) related to the target pixel pixel(cur,i,j) is obtained by calculating equation (10).

Step S128: Determine whether processing for this image data is carried out or not. If yes, it is terminated; otherwise, the flow returns to the step S120 for the next m×n block. It should be noted that the sigma filtering method is carried out based on the luminance of the image. Those who are skilled in the art will appreciate that the sigma filtering method can be carried out based on the chrominance of the image.

Finally, the median filter 114 receives the outputs of the vertical horizontal filter 112 and the sigma filter 113. As long as the flag salt_pepper(i,j) or the mosquito flag mnr_rgn(i,j) of the target pixel (i,j) is set to 1, a median filtering operation is performed over the 3×3 block that the target pixel (i,j) belongs to. Otherwise, the median filter 114 directly outputs its inputs to generate the output value S(i,j) and the corresponding parameter s_alpha(i,j). FIG. 13 shows one example of the luminance y of a 3×3 block having a target pixel (i,j) as the center. Take luminance for example. The median filter 114 performs the median filtering operation along four directions for the 3×3 block in FIG. 13 and obtains the following median values of four directions.

$$med1=median(y(i-1,j),y(i,j),y(i+1,j));/*horizontal*/$$

$$med2=median(y(i,j-1),y(i,j),y(i,j+1));/*vertical*/$$

$$med3=median(y(i-1,j-1),y(i,j),y(i+1,j+1));/*lower\ left\ upper\ right*/$$

$$med4=median(y(i-1,j+1),y(i,j),y(i+1,j-1));/*upper\ left\ lower\ right*/$$

The maximum and the minimum among the four median values are as follows:

$$max\_med=max(med1,med2,med3,med4);$$

$$min\_med=min(med1,med2,med3,med4);$$

Then, calculate diff=median(max_med, min_med, y(i,j))−y(i,j)). If abs(diff) is less than a threshold value sp_th1, the output value of the median filter 114 is S(i,j)=y(i,j)+diff× sp_th2; otherwise, the output value S(i,j)=y(i,j). In one embodiment, sp_th1=24 and sp_th2=0.5.

The circuit configuration of the dynamic noise filter according to the invention is adjustable according to different image application needs so as to decrease the hardware cost. For example, the circuit configuration in FIG. 14 is applicable to the static image applications while the circuit configuration in FIG. 15 is applicable to the motion image applications.

Figure 14:
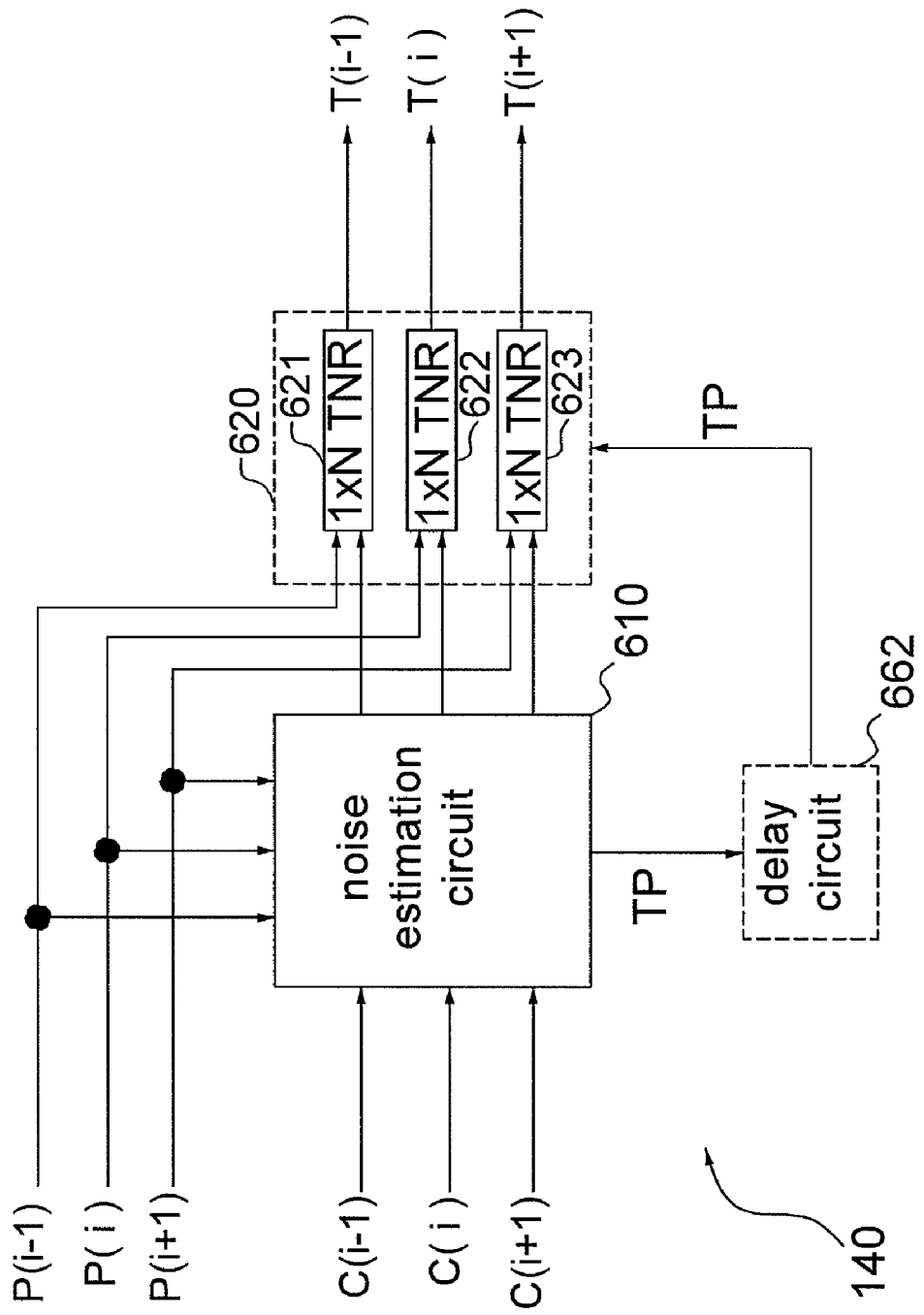
FIG. 14 shows a schematic diagram of a dynamic noise filter according to another embodiment of the invention.
Figure 15:
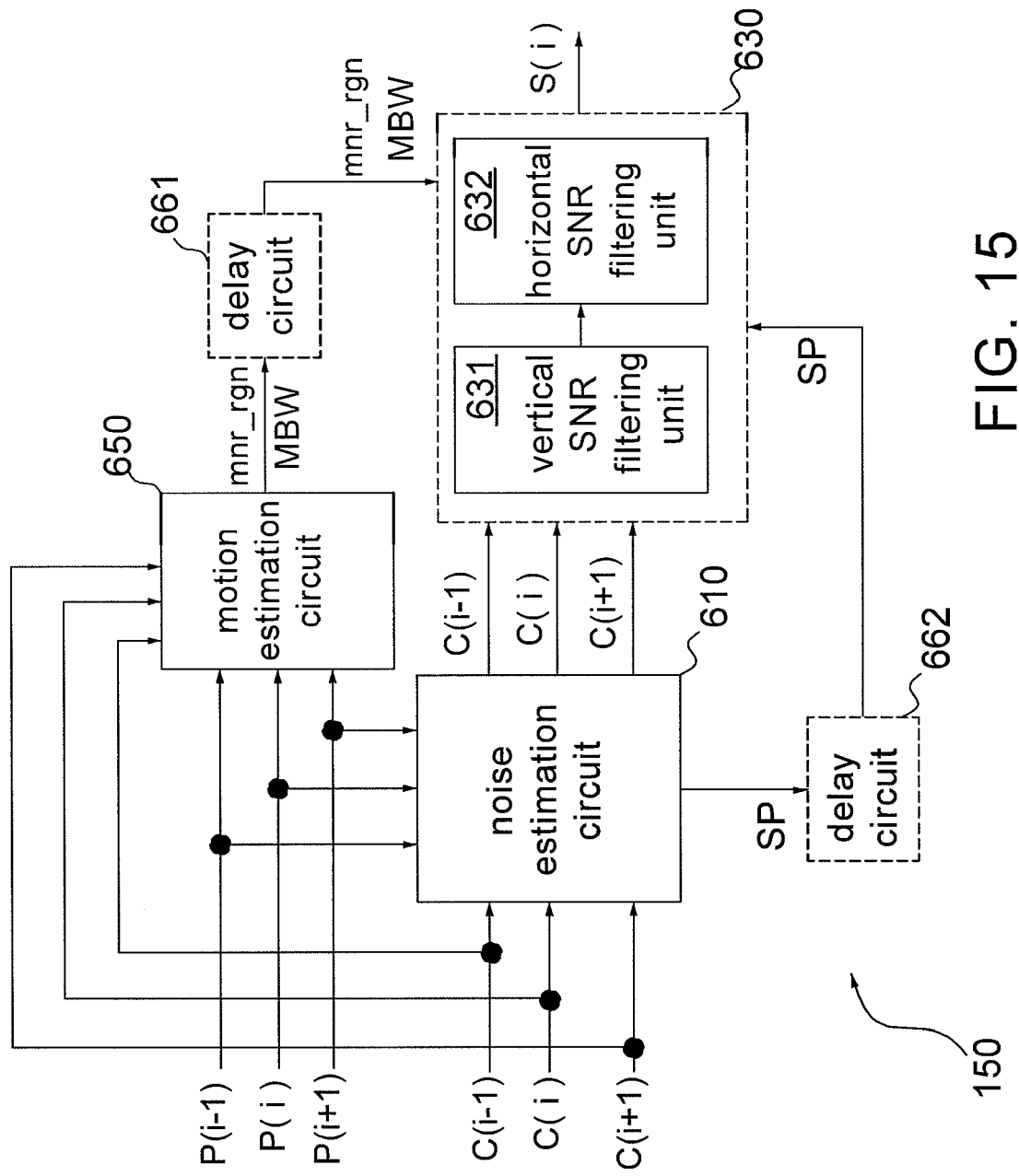
FIG. 15 shows a schematic diagram of a dynamic noise filter according to another embodiment of the invention.

FIG. 14 shows a schematic diagram of a dynamic noise filter according to another embodiment of the invention. Referring to FIG. 14, the dynamic noise filter 140 according to the invention includes a noise estimation circuit 610 and a TNR filter 620. Since the structures and operation of the noise estimation circuit 610 and the TNR filter 620 are discussed above, the description will not be given hereinafter. FIG. 15 shows a schematic diagram of a dynamic noise filter according to another embodiment of the invention. Referring to FIG. 15, the dynamic noise filter 150 according to the invention includes a noise estimation circuit 610, a SNR filter 630, and a motion estimation circuit 650. Since the structures and operations of the noise estimation circuit 610, the SNR filter 630, and the motion estimation circuit 650 are discussed above, the description will not be given hereinafter. It should be noted that the SNR filter 630 according to this embodiment can only be implemented using a vertical horizontal filter and cannot be implemented using the circuit of FIG. 11 due to lack of the input parameter flow t_alpha.

In conclusion, a feature of the invention is that the noise mean and the noise variance of each image are calculated respectively to correspondingly generate the temporal attribute parameter TP and the spatial attribute parameter SP for each image; accordingly, the strengths of both the SNR filter and the TNR filter and a blending ratio between the output of the SNR filter and the output of the TNR filter are modified dynamically. Moreover, if there is mosquito noise or salt-and-pepper noise detected in the image, the optimum image quality can also be achieved by modifying the strength of the SNR filter.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. A dynamic noise filter, comprising:
a noise estimation circuit for calculating a noise mean (u) and a noise variance (v) according to maximum absolute luminance differences of estimation blocks associated with a plurality of pixels having the several lowest noise levels according, to a current image and its corresponding preceding image and performing noise estimation to generate a temporal attribute parameter and a spatial attribute parameter of the current image;
a temporal noise reduction (TNR) filtering circuit for receiving the current image and its corresponding preceding image, modifying a first kink position in its own TNR characteristic curve at a minimum alpha value to form an updated TNR characteristic curve for the current image according to the temporal attribute parameter generated by the noise estimation circuit at the preceding image period and generating at least one first filtered scan line and a corresponding first parameter flow;
a motion estimation circuit for providing both settings of pixels in a mosquito noise region and a movement amount of a mosquito noise block comprising a target pixel according to an input image and its corresponding preceding image when the mosquito noise block has a strong edge region, wherein when a difference between a maximum value and a minimum value of the mosquito noise block is greater than a threshold value, the mosquito noise block is expanded to the mosquito noise region and the mosquito noise block is regarded as having the strong edge region;
a spatial noise reduction (SNR) filtering circuit for modifying a second kink position in its own SNR characteristic curve at a maximum gain value to form an updated SNR characteristic curve for the current image and for generating a second filtered scan line and a corresponding second parameter flow according to the spatial attribute parameter generated by the noise estimation circuit at the preceding image period, preceding outputs of the motion estimation circuit, and the at least one first filtered scan line and the corresponding first parameter flow; and
a blending circuit for sequentially blending the second filtered scan line and one of the at least one first filtered scan line to generate an output scan line according to the corresponding second parameter flow.

2. The filter according to claim 1, further comprising:
a first delay circuit, coupled among the noise estimation circuit, the TNR filtering circuit, the SNR filtering circuit, for delaying the temporal attribute parameter and the spatial attribute parameter for one image period; and
a second delay circuit, coupled between the motion estimation circuit and the SNR filtering circuit, for delaying outputs of the motion estimation circuit for one or two field periods when the current image is a field and for delaying the outputs of the motion estimation circuit for one frame period when the current image is a frame.

3. The filter according to claim 1, wherein the input image is the current image or the output image of the TNR filtering circuit.

4. The filter according to claim 3, wherein, when the input image is the output of the TNR filtering circuit, the front end of the TNR filtering circuit is further provided with a third delay circuit for delaying the corresponding preceding image of the input image for the operating time of the TNR filtering circuit.

5. The filter according to claim 1, wherein the spatial attribute parameter comprises hl_coring, hc_coring, vl_coring, and vc_coring; wherein $$hl\_coring = lpu\_snr * hl\_th1 + lpv\_snr * hl\_th2;$$

$$hc\_coring = lpu\_snr * hc\_th1 + lpv\_snr * hc\_th2;$$

$$vl\_coring = lpu\_snr * vl\_th1 + lpv\_snr * vl\_th2;$$

$$vc\_coring = lpu\_snr * vc\_th1 + lpv\_snr * vc\_th2;$$

wherein $$lpu\_snr = (u * ne\_alpha + lpu\_snr * (16 - ne\_alpha))/16;$$

$$lpv\_snr = (v * ne\_alpha + lpv\_snr * (16 - ne\_alpha))/16;$$
and wherein ne_alpha is a preset value less than 16.

6. The filter according to claim 5, wherein the SNR filtering circuit is implemented using a vertical horizontal filter and the vertical horizontal filter comprises at least one vertical SNR filtering unit and at least one horizontal SNR filtering unit.

7. The filter according to claim 6, wherein each horizontal SNR filtering unit and each vertical SNR filtering unit modify the spatial attribute parameter and the second parameter flow according to the preceding outputs of the motion estimation circuit.

8. The filter according to claim 7, wherein each horizontal filtering unit dynamically modifies the second kink position in its own horizontal SNR luminance characteristic curve at the maximum gain value to form an updated horizontal SNR luminance characteristic curve for the current image according to hl_coring;

wherein each horizontal filtering unit dynamically modifies the second kink position in its own horizontal SNR chrominance characteristic curve at the maximum gain value to form an updated horizontal SNR chrominance characteristic curve for the current image according to hc_coring;

wherein each vertical filtering unit dynamically modifies the second kink position in its own vertical SNR luminance characteristic curve at the maximum gain value to form an updated vertical SNR luminance characteristic curve for the current image according to vl_coring; and wherein each vertical filtering unit dynamically modifies the second kink position in its own vertical SNR chrominance characteristic curve at the maximum gain value to form an updated vertical SNR chrominance characteristic curve for the current image according to vc_coring.

9. A dynamic noise filter comprising:

a noise estimation circuit for receiving a current image and its corresponding preceding image and performing noise estimation to generate a temporal attribute parameter and a spatial attribute parameter;

a temporal noise reduction (TNR) filtering circuit for receiving the current image and its corresponding preceding image and modifying its own TNR characteristic curve to generate at least one first filtered scan line and the corresponding first parameter flow according to the temporal attribute parameter generated by the noise estimation circuit at the preceding image period;

a motion estimation circuit for performing both a setting and a motion estimation of a mosquito noise block according to an input image and its corresponding preceding image;

a spatial noise reduction (SNR) filtering circuit for generating a second filtered scan line and a corresponding second parameter flow according to the spatial attribute parameter generated by the noise estimation circuit at the preceding image period, preceding outputs of the motion estimation circuit, and the at least one first filtered scan line and the corresponding first parameter flow; and a blending circuit for sequentially blending the second filtered scan line and one of the at least one first filtered scan line to generate an output scan line according to the corresponding second parameter flow;

wherein the SNR filtering circuit comprises:

a vertical horizontal filter for receiving the at least one first filtered scan line and the corresponding first parameter flow and for modifying its own SNR characteristic curve according to the spatial attribute parameter generated by the noise estimation circuit at the preceding image period and the preceding outputs of the motion estimation circuit to thereby generate a third filtered scan line and the second parameter flow, wherein the vertical horizontal filter comprises at least one vertical filtering unit and at least one horizontal filtering unit;

a sigma filter for receiving the at least one first filtered scan line and the corresponding first parameter flow and for performing an average calculation for a block including a target pixel according to a predetermined pixel difference range and a predetermined negative slope to thereby generate a fourth filtered scan line and its corresponding salt-and-pepper flag flow;

a decision circuit for deciding to enable either the vertical horizontal filter or the sigma filter according to a preset edge value and a difference between the maximum luminance value and the minimum luminance value of the block including the target pixel in the at least one first filtered scan line; and a median filter for receiving the outputs of the vertical horizontal filter and the sigma filter and for deciding whether to perform a median filtering operation over the block including the target pixel to thereby generate the second filtered scan line and its corresponding second parameter flow according to a salt-and-pepper flag and a mosquito flag of the target pixel.

10. A dynamic noise filter, comprising:

a noise estimation circuit for calculating a noise mean (u) and a noise variance (v) according to maximum absolute luminance differences of estimation blocks associated with a plurality of pixels having the several lowest noise levels according to a current image and its corresponding preceding image and performing noise estimation to generate a temporal attribute parameter of the current image; and a temporal noise reduction (TNR) filtering coupled to the noise estimation circuit for receiving the current image and its corresponding preceding image, modifying a kink position in its own TNR characteristic curve at a minimum alpha value to form an updated TNR characteristic curve for the current image according to the temporal attribute parameter generated by the noise estimation circuit at the preceding image period, and generating a temporal filtered image.

11. The filter according to claim 10, further comprising:

a delay circuit coupled to the noise estimation circuit for delaying the temporal attribute parameter for one image period.

12. The filter according to claim 10, wherein the noise estimation circuit further modifies the magnitude of the temporal attribute parameter according to the degree that the current image is close to a static image.

13. A dynamic noise filter; comprising:

a noise estimation circuit for calculating a noise mean (u) and a noise variance (v) according to maximum absolute luminance differences of estimation blocks associated with a plurality of pixels having the several lowest noise levels according to a current image and its corresponding preceding image, performing noise estimation and generating a spatial attribute parameter of the current image;

a motion estimation circuit for providing both settings of pixels in a mosquito noise region and a movement amount of a mosquito noise block comprising a target pixel according to an input image and its corresponding preceding image when the mosquito noise block has a strong edge region, wherein when a difference between a maximum value and a minimum value of the mosquito noise block is greater than a threshold value, the mosquito noise block is expanded to the mosquito noise region and the mosquito noise block is regarded as having the strong edge region; and a spatial noise reduction (SNR) filtering circuit for receiving the current image, modifying a kink position in its own SNR characteristic curve at a maximum gain value to form an updated SNR characteristic curve for the current image and generating a spatial filtered image according to the spatial attribute parameter generated by the noise estimation circuit at the preceding image period and preceding outputs of the motion estimation circuit.

14. The filter according to claim 13, further comprising:

a first delay circuit coupled between the noise estimation circuit and the SNR filtering circuit for delaying the spatial attribute parameter for one image period; and a second delay circuit coupled between the motion estimation circuit and the SNR filtering circuit for delaying the outputs of the motion estimation circuit for one or two field periods when the current image is a field and delaying the outputs of the motion estimation circuit for one frame period when the current image is a frame.

15. The filter according to claim 13, wherein the spatial attribute parameter comprises hl_coring, hc_coring, vl_coring, and vc_coring; wherein $$hl\_coring = lpu\_snr * hl\_th1 + lpv\_snr * hl\_th2;$$

$$hc\_coring = lpu\_snr * hc\_th1 + lpv\_snr * hc\_th2;$$

$$vl\_coring = lpu\_snr * vl\_th1 + lpv\_snr * vl\_th2;$$

$$vc\_coring = lpu\_snr * vc\_th1 + lpv\_snr * vc\_th2;$$

wherein $$lpu\_snr = (u * ne\_alpha + lpu\_snr * (16 - ne\_alpha))/16;$$

$$lpv\_snr = (v * ne\_alpha + lpv\_snr * (16 - ne\_alpha))/16;$$
and wherein ne_alpha is a preset value less than 16.

16. The filter according to claim 15, wherein the SNR filtering circuit is implemented using a vertical horizontal filter and the vertical horizontal filter comprises at least one vertical SNR filtering unit and at least one horizontal SNR filtering unit.

17. The filter according to claim 16, wherein each horizontal filtering unit and each vertical filtering unit modify the spatial attribute parameter according to the preceding outputs of the motion estimation circuit.

18. The filter according to claim 17, wherein each horizontal filtering unit dynamically modifies the kink position in its own horizontal SNR luminance characteristic curve at the maximum gain value to form an updated horizontal SNR luminance characteristic curve for the current image according to hl_coring;

wherein each horizontal filtering unit dynamically modifies the kink position in its own horizontal SNR chrominance characteristic curve at the maximum gain value to form an updated horizontal SNR chrominance characteristic curve for the current image according to hc_coring;

wherein each vertical filtering unit dynamically modifies the kink position in its own vertical SNR luminance characteristic curve at the maximum gain value to form an updated vertical SNR luminance characteristic curve for the current image according to vl_coring; and wherein each vertical filtering unit dynamically modifies the kink position in its own vertical SNR chrominance characteristic curve at the maximum gain value to form an updated vertical SNR chrominance characteristic curve for the current image according to vc_coring.

19. The filter according to claim 1, wherein the updated TNR characteristic curve is a alpha-abslpdiff characteristic curve, wherein abslpdiff is a sum of low-pass filtered luminance differences of a TNR block (m×n) containing a corresponding target pixel according to the current image (cur) and its corresponding preceding image (pre), such that $$abslpdiff(i, j) = \sum_{\substack{-m/2 \leq y \leq m/2 \\ -n/2 \leq x \leq n/2}} (pixel(cur, i+y, j+x) - pixel(pre, i+y, j+x)) * w(y, x);$$

and wherein $$\sum_{\substack{-m/2 \leq y \leq m/2 \\ -n/2 \leq x \leq n/2}} w(y, x)$$

is a m×n low-pass filter.

20. The filter according to claim 19, wherein the temporal attribute parameter comprises nr_alpha and nr_th1: wherein nr_alpha denotes the minimum alpha value and nr_th1 denotes a value on a abslpdiff axis corresponding to the first kink position; wherein $$nr\_alpha = nr\_alpha - (lpv - v\_ref) * alpha\_fact;$$

$$nr\_th1 = nr\_th1 + (lpu - u\_ref) * th1\_fact;$$

wherein $$lpu = (u * ne\_alpha + lpu * (16 - ne\_alpha))/16;$$

$$lpv = (v * ne\_alpha + lpv * (16 - ne\_alpha))/16;$$

wherein ne_alpha is a preset value less than 16;
and wherein v_ref, u_ref, alpha_fact and th1_fact are preset values.

21. The filter according to claim 19, wherein the TNR filtering circuit sequentially calculates the sum of low-pass filtered luminance differences between the current image and its corresponding preceding image for each TNR block containing the corresponding target pixel and obtains a corresponding temporal filtered pixel and a corresponding first parameter according to the updated TNR characteristic curve.

22. The filter according to claim 19, wherein the updated TNR characteristic curve has fixed slopes and a fixed distance between two kinks along the abslpdiff axis.

23. The filter according to claim 1, wherein the updated SNR characteristic curve is a gain-ppdiff characteristic curve, wherein ppdiff is a difference between a maximum value and a minimum value of a SNR block containing a corresponding target pixel, wherein the spatial attribute parameter denotes a value on a ppdiff axis corresponding to the second kink position, and wherein the updated SNR characteristic curve has fixed slopes and a fixed minimum gain value.

24. The filter according to claim 10, wherein the updated TNR characteristic curve is a alpha-abslpdiff characteristic curve; wherein nr_alpha denote the minimum alpha value and nr_alpha denote a value on a abslpdiff axis corresponding to the kink position; wherein abslpdiff is a sum of low-pass filtered luminance differences of a TNR block (m×n) containing a corresponding target pixel according to the current image (cur) and its corresponding preceding image (pre), such that $$abslpdiff(i, j) = \sum_{\substack{-m/2 \leq y \leq m/2 \\ -n/2 \leq x \leq n/2}} (pixel(cur, i+y, j+x) - pixel(pre, i+y, j+x)) * w(y, x);$$

and wherein $$\sum_{\substack{-m/2 \leq y \leq m/2 \\ -n/2 \leq x \leq n/2}} w(y, x)$$

is a m×n low-pass filter.

25. The filter according to claim 24, wherein the temporal attribute parameter comprises nr_alpha and nr_th1; wherein nr_alpha denotes the minimum alpha value and nr_th1 denotes a value on a abslpdiff axis corresponding to the kink position;
wherein $$nr\_alpha = nr\_alpha - (lpv - v\_ref) * alpha\_fact;$$

$$nr\_th1 = nr\_th1 + (lpu - u\_ref) * th1\_fact;$$

wherein $$lpu = (u * ne\_alpha + lpu * (16 - ne\_alpha))/16;$$

$$lpv = (v * ne\_alpha + lpv * (16 - ne\_alpha))/16;$$

wherein ne_alpha is a preset value less than 16;
and wherein v_ref, u_ref, alpha_fact and th1_fact are preset values.

26. The filter according to claim 24, wherein the TNR filtering circuit sequentially calculates the sum of low-pass filtered luminance differences between the current image and its corresponding preceding image for each TNR block containing the corresponding target pixel and obtains a corresponding temporal filtered pixel according to the updated TNR characteristic curve.

27. The filter according to claim 24, wherein the updated TNR characteristic curve has fixed slopes and a fixed distance between two kinks along the abslpdiff axis.

28. The filter according to claim 13, wherein the updated SNR characteristic curve is a gain-ppdiff characteristic curve, wherein ppdiff is a difference between a maximum value and a minimum value of a SNR block containing a corresponding target pixel in the current image, wherein the spatial attribute parameter denotes a value on a ppdiff axis corresponding to the kink position, and wherein the updated SNR characteristic curve has fixed slopes and a fixed minimum gain value.

29. The filter according to claim 28, wherein the SNR filtering circuit sequentially calculates the difference between the maximum value and the minimum value of each SNR block containing the corresponding target pixel in the current image and obtains a corresponding spatial filtered pixel according to the updated SNR characteristic curve.

* * * * *